(12) United States Patent
Park et al.

(10) Patent No.: US 12,468,128 B2
(45) Date of Patent: Nov. 11, 2025

(54) LENS ASSEMBLY, IMAGING APPARATUS INCLUDING THE LENS ASSEMBLY, AND ELECTRONIC APPARATUS INCLUDING THE LENS ASSEMBLY

(71) Applicant: SAMSUNG ELECTRONICS CO., LTD., Suwon-si (KR)

(72) Inventors: Hyunsung Park, Suwon-si (KR); Seunghoon Han, Seoul (KR); Hyeonsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 477 days.

(21) Appl. No.: 17/974,726

(22) Filed: Oct. 27, 2022

(65) Prior Publication Data
US 2023/0127423 A1 Apr. 27, 2023

Related U.S. Application Data

(60) Provisional application No. 63/272,441, filed on Oct. 27, 2021.

(30) Foreign Application Priority Data

Jun. 23, 2022 (KR) .......................... 10-2022-0077081

(51) Int. Cl.
- *G02B 13/00* (2006.01)
- *G02B 1/00* (2006.01)
- *G02B 5/18* (2006.01)

(52) U.S. Cl.
CPC ......... *G02B 13/0055* (2013.01); *G02B 1/002* (2013.01); *G02B 5/1809* (2013.01);
(Continued)

(58) Field of Classification Search
CPC ............ G02B 13/0035; G02B 13/0045; G02B 13/0055; G02B 9/10; G02B 9/14–32;
(Continued)

(56) References Cited

U.S. PATENT DOCUMENTS 11,454,808 B2 * 9/2022 Park ........................ G02B 26/06
11,747,524 B2 * 9/2023 Park ..................... G02B 5/1809
359/652

(Continued)

FOREIGN PATENT DOCUMENTS

| CN | 110488394 B | 1/2019 | |
|---|---|---|---|
| KR | 10-2021-0052177 A | 5/2021 | |
| WO | WO-2021170417 A1 * | 9/2021 | ......... G02B 27/0056 |

OTHER PUBLICATIONS

Cuillerier, et al., "Toward Hybrid Refractive and Metalens Design," International Optical Design Conference 2021, edited by Peter P. Clark, Richard N. Pfisterer, Henning Rehn, Simon Thibault, Proc. of SPIE vol. 12078, 120781W, 0277-786X, doi: 10.1117/12.2603686. (Year: 2021).*

*Primary Examiner* — Nicholas R. Pasko
(74) *Attorney, Agent, or Firm* — Sughrue Mion, PLLC

(57) ABSTRACT

Provided are a lens assembly, an image apparatus including the same, and an electronic apparatus including the lens assembly. The lens assembly includes a first refractive lens, a second refractive lens, and a meta lens arranged between the second refractive lens and an image plane, wherein the first refractive lens, the second refractive lens, and the meta lens are arranged from an object side to an image side.

18 Claims, 18 Drawing Sheets

(52) U.S. Cl.
CPC ..... *G02B 13/0035* (2013.01); *G02B 13/0045* (2013.01); *G02B 2207/101* (2013.01)

(58) Field of Classification Search
CPC . G02B 9/60; G02B 9/62; G02B 1/002; G02B 5/1809
See application file for complete search history.

(56) References Cited

U.S. PATENT DOCUMENTS

| | | | |
|---|---|---|---|
| 2007/0070510 A1* | 3/2007 | Sato | G02B 13/0035 |
| | | | 359/642 |
| 2007/0153387 A1* | 7/2007 | Pawlowski | G02B 9/10 |
| | | | 359/565 |
| 2012/0026384 A1* | 2/2012 | Yamada | G02B 13/004 |
| | | | 348/340 |
| 2013/0250438 A1* | 9/2013 | Hsieh | G02B 13/003 |
| | | | 359/708 |
| 2016/0316180 A1 | 10/2016 | Han et al. | |
| 2020/0174163 A1* | 6/2020 | Han | G02B 5/1895 |
| 2020/0249429 A1* | 8/2020 | Han | G02B 5/188 |
| 2020/0264343 A1* | 8/2020 | Han | G02B 1/14 |
| 2021/0028215 A1* | 1/2021 | Devlin | H10F 39/8053 |
| 2021/0132256 A1 | 5/2021 | Park et al. | |
| 2021/0149081 A1* | 5/2021 | Groever | G02B 5/1842 |
| 2024/0411059 A1* | 12/2024 | Mattinson | G02B 13/0055 |

* cited by examiner

LENS ASSEMBLY, IMAGING APPARATUS INCLUDING THE LENS ASSEMBLY, AND ELECTRONIC APPARATUS INCLUDING THE LENS ASSEMBLY

CROSS-REFERENCE TO RELATED APPLICATIONS

This application is based on and claims priority under 35 U.S.C. § 119 to Korean Patent Application No. 10-2022-0077081, filed on Jun. 23, 2022, in the Korean Intellectual Property Office, and U.S. Provisional Application No. 63/272,441, filed on Oct. 27, 2021, the disclosures of which are incorporated by reference herein in their entirety.

BACKGROUND

1. Field

The disclosure relates to a lens assembly including a meta lens, an imaging apparatus including the lens assembly, and an electronic apparatus including the lens assembly.

2. Description of the Related Art

An imaging apparatus, such as a camera, having an image sensor such as a charge-coupled device (CCD) or a complementary metal-oxide semiconductor (CMOS) is used as an optical apparatus for photographing an image or a video. In order to obtain high quality images and/or videos, a lens assembly composed of a combination of a plurality of lenses may be used in a camera. The camera including the lens assembly and the image sensor may be mounted on various electronic apparatuses such as augmented reality or virtual reality apparatuses, small electronic apparatuses such as portable wireless terminals, etc.

In order to obtain a high-quality image and/or video, at least a part of a plurality of lenses constituting the lens assembly is configured to remove various aberrations that degrade image quality, and such a configuration increases the total length of the lens assembly, thereby making it difficult to miniaturize the camera. In addition, in portable wireless terminals such as smartphones, etc., it is difficult to implement a camera having a lens assembly for various magnifications with high performance due to limitations in the mounting space and the lens material.

SUMMARY

Provided are a lens assembly for implementing a telephoto camera of various magnifications, an imaging apparatus including the lens assembly, and an electronic apparatus including the lens assembly.

Additional aspects will be set forth in part in the description which follows and, in part, will be apparent from the description, or may be learned by practice of the presented embodiments of the disclosure.

According to an aspect of the disclosure, there is provided a lens assembly including: a first refractive lens; a second refractive lens; and a meta lens arranged between the second refractive lens and an image plane, wherein the second refractive lens is provided between the first refractive lens and the meta lens, wherein, among the first refractive lens and the second refractive lens, the first refractive lens is provided closest to an object; and wherein the meta lens may include a first meta lens and a second meta lens spaced apart from the first meta lens.

The first refractive lens may have a positive refractive power and includes a low dispersion material, and wherein the second refractive lens may have a negative refractive power and may include a high dispersion material.

The first refractive lens may include a plastic material having an Abbe number of 45 or more and 65 or less.

The second refractive lens may include a plastic material having an Abbe number of 25 or more and 45 or less.

The second refractive lens may include a plastic material having an Abbe number of 25 or more and 45 or less.

The first refractive lens may be configured to focus light, and wherein at least one of the second refractive lens and the meta lens may be configured to correct chromatic aberration.

The meta lens may be configured to correct primary chromatic aberration, and wherein the second refractive lens may be configured to correct secondary chromatic aberration.

The lens assembly may further include an optical element configured to bend light in traveling direction of the light in a place between the second refractive lens and the meta lens and between the meta lens and the image plane.

The optical element may be a prism.

The lens assembly may further include at least one refractive lens configured to focus, on the image plane, light incident at a first incident angle between the meta lens and the image plane.

The lens assembly may further include a spacer provided between the first meta lens and the second meta lens.

Each of the first and second meta lenses may include an array of a plurality of nanostructures, and wherein each of the plurality of nanostructures has a shape dimension less than an operating wavelength and has a width, which varies according to a position in the array.

A first refractive index of the plurality of nanostructures is greater or less by 0.5 or more than a second refractive index of a peripheral material of the plurality of nanostructures.

The plurality of nanostructures may include at least one of c-Si, p-Si, a-Si, III-V compound semiconductor, SiC, $TiO_2$, $TiSiO_x$, or SiN, and wherein the plurality of nanostructures are provided to have a refractive index greater than the refractive index of the peripheral material.

The plurality of nanostructures may be formed of one of $SiO_2$ or air, and wherein the plurality of nanostructures are provided to have a refractive index less than the refractive index of the peripheral material.

At least one of the first and second meta lenses may include the plurality of nanostructures and a peripheral material configured to surround the plurality of nanostructures, and an effective refractive index of each of the plurality of nanostructures is greater than or less than an effective refractive index of the peripheral material.

At least one of the first and second meta lenses may include: a layer including the plurality of nanostructures, and a peripheral material configured to surround the plurality of nanostructures in a single layer or in two or more layers.

The III-V compound semiconductor may include at least one of GaP, GaN or GaAs.

According to another aspect of the disclosure, there is provided an imaging apparatus including: a lens assembly; and an image sensor configured to convert an optical image formed by the lens assembly into an electrical signal, wherein the lens assembly may include: a first refractive lens, a second refractive lens, and a meta lens arranged between the second refractive lens and an image plane, wherein the second refractive lens is provided between the first refractive lens and the meta lens, wherein, among the first refractive lens and the second refractive lens, the first refractive lens is provided closest to an object, and wherein the meta lens may include a first meta lens and a second meta lens spaced apart from the first meta lens.

According to another aspect of the disclosure, there is provided an electronic apparatus may include a camera including: a lens assembly including a first refractive lens, a second refractive lens, and a meta lens arranged between the second refractive lens and an image plane; and an image sensor configured to convert an optical image formed by the lens assembly into an electrical signal, wherein the second refractive lens is provided between the first refractive lens, the second refractive lens, and the meta lens are arranged from an object side to an image side, wherein, among the first refractive lens and the second refractive lens, the first refractive lens is provided closest to an object, and wherein the meta lens may include a first meta lens and a second meta lens spaced apart from the first meta lens.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
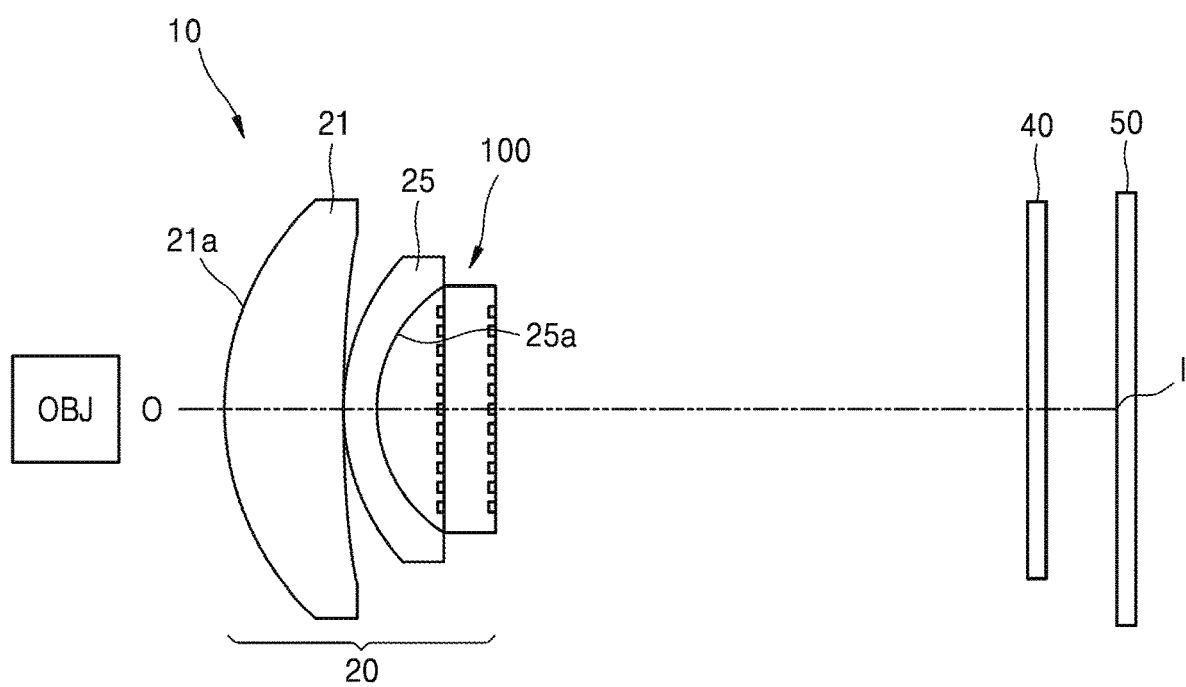
FIG. 1 schematically illustrates an optical configuration of a lens assembly according to an example embodiment and an imaging apparatus including the lens assembly.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. In the following drawings, the same reference numerals refer to the same components, and the size of each component in the drawings may be exaggerated for clarity and convenience of description. Meanwhile, the embodiments described below are merely exemplary, and various modifications are possible from these embodiments.

Hereinafter, the term "upper portion" or "on" may also include "to be present above, below, or in the left or right on a non-contact basis" as well as "to be on the top portion, the bottom portion, or in the left or right in directly contact with". Singular expressions include plural expressions unless they are explicitly meant differently in context. In addition, when a part "includes" a component, this means that it may include more other components, rather than excluding other components, unless otherwise stated.

The use of the term "the" and similar indicative terms may correspond to both singular and plural. If there is no explicit description or contrary description of the steps constituting the method, these steps may be carried out in an appropriate order and are not necessarily limited to the stated order.

Further, the terms "unit", "module" or the like mean a unit that processes at least one function or operation, which may be implemented in hardware or software or implemented in a combination of hardware and software. For example, "unit", "module" and other functional blocks of the disclosure may include components that are implemented by a circuitry or a processor. Moreover, according to an example embodiment, "modules" of the disclosure may be hardware components or a combination of hardware components.

The connection or connection members of lines between the components shown in the drawings exemplarily represent functional connection and/or physical or circuit connections, and may be replaceable or represented as various additional functional connections, physical connections, or circuit connections in an actual apparatus.

The use of all examples or exemplary terms is simply for describing a technical idea in detail and the scope is not limited by these examples or exemplary terms unless limited by the claims.

A lens assembly according to an example embodiment may include a combination of a plurality of refractive lenses and a meta lens, and may be implemented into a telephoto lens assembly and a telephoto camera module of various magnifications. When the lens assembly according to an example embodiment is applied, for example, a telephoto camera and an electronic apparatus including the same may be implemented, and mounting space constraints of portable wireless terminals or various electronic apparatuses such as smartphones and lens material limitations may be overcome.

The lens assembly according to an example embodiment may be mounted on various electronic apparatuses requiring a telephoto camera. The electronic apparatus according to this embodiment may include a smartphone, a foldable phone, a wearable apparatus, an Internet of Things (IoT) apparatus, a home appliance, a tablet PC, a desktop PC, a laptop PC, a game console, a personal digital assistant (PDA), a portable multimedia player (PMP), a medical apparatus, a camera, navigation system, a drone, a robot, an unmanned vehicle, an autonomous vehicle, an advanced drivers assistance system (ADAS), etc. In addition, the electronic apparatus according to an example embodiment may include various apparatuses to which a telephoto camera is applied.

Hereinafter, for convenience, an imaging apparatus including a lens assembly according to an example embodiment and an image sensor is described as a telephoto camera, etc., as necessary, but the disclosure is not limited thereto. For example, an imaging apparatus including a lens assembly according to an example embodiment and an image sensor may be implemented by various types of cameras as well as telephoto cameras, and may be applied to various electronic apparatuses requiring a camera module.

FIG. 1 schematically illustrates an optical configuration of a lens assembly 20 according to an example embodiment and an imaging apparatus 10 to which the lens assembly is applied.

Referring to FIG. 1, the imaging apparatus 10 may include a lens assembly 20 and an image sensor 50 for converting an optical image of an object OBJ formed by the lens assembly 20 into an electrical image signal. According to an example embodiment, the image sensor 50 may constitute an imaging lens. An optical filter 40 such as an infrared blocking filter may be further provided between the lens assembly 20 and the image sensor 50. The optical filter 40 such as the infrared blocking filter located at the front end of the image sensor 50 may or may not be considered as a component of the lens assembly 20.

The lens assembly 20 according to an example embodiment may include a first refractive lens 21, a second refractive lens 25, and a meta lens 100, which are arranged from an object side O to an image side I. The lens assembly 20 according to an example embodiment may further include a refractive lens. An optical image of an object OBJ may be formed on an image plane by the lens assembly 20. In the imaging apparatus 10 including the lens assembly 20 according to an example embodiment, the image sensor 50 may be arranged on the image plane thereof.

The first refractive lens 21 is provided mainly to focus light, and may be formed of a low-dispersion material, for example, a low-dispersion plastic material with positive refractive power. For example, the first refractive lens 21 may be formed of a plastic material having an Abbe number of 45 or more and 65 or less. The first refractive lens 21 may be provided such that a lens surface 21a facing the object side O is convex so as to have relatively strong positive refractive power. When the first refractive lens 21 has strong positive refractive power, long-wavelength light may generate positive chromatic aberration having a longer focal length compared to short-wavelength light.

The second refractive lens 25 has negative refractive power and may be formed of a high dispersion material, for example, a high dispersion plastic material. For example, the second refractive lens 25 may be formed of a plastic material having an Abbe number of 25 or more and 45 or less. The second refractive lens 25 may be provided to have negative refractive power, and may be provided to correct chromatic aberration and/or a curvature of field generated by another lens, for example, the first refractive lens 21.

For example, when the meta lens 100 is provided to mainly contribute to primary chromatic aberration correction, the second refractive lens 25 may be provided to correct secondary chromatic aberration. In addition, the second refractive lens 25 may have an aspheric surface on a surface facing an object side O and/or a surface facing an image side I, and the aspheric surface may reduce distortion when light passes through a marginal portion of a lens, for example, the first refractive lens 21 and/or the second refractive lens 25. In addition, the second refractive lens 25 may be formed as a meniscus lens in which a lens surface 25a facing the image side I is concave, and thus may be provided to improve coma aberration and astigmatic aberration, which are phenomena in which light passing through a marginal portion of a lens, for example, the first refractive lens 21 and/or the second refractive lens 25 does not form a clear image.

Here, a lens having positive refractive power is a lens based on the principle of a convex lens having a positive focal length, and may pass and condense light incident parallel to the optical axis O-I. Meanwhile, a lens having negative refractive power is a lens based on the principle of a concave lens, and may pass and diverge light incident in parallel.

In the lens assembly 10 according to an example embodiment, the meta lens 100 may be provided to correct chromatic aberration. The meta lens 100 may be provided to have negative chromatic aberration, and may correct some or all of the chromatic aberration generated by the first refractive lens 21.

In general, a lens having negative refractive power, such as a Flint lens, is used to correct chromatic aberration, which may cause problems of loss of refractive power and increase in thickness of a lens assembly. When the meta lens 100 is applied to mainly contribute to primary chromatic aberration correction, such as the lens assembly 20 according to an example embodiment, a loss of refractive power may be reduced and a thickness of the lens assembly 20 may be reduced.

Figure 5:
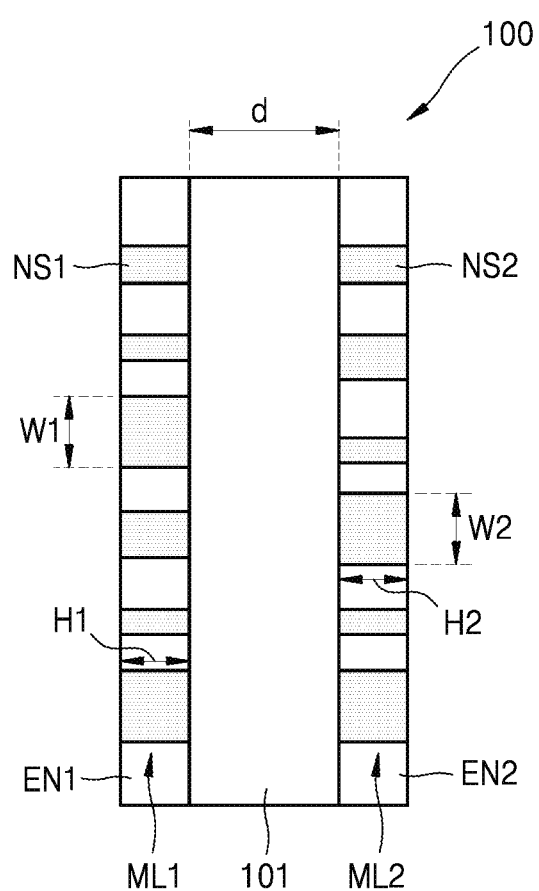
FIG. 5 is a cross-sectional view schematically illustrating a configuration of a meta lens included in a lens assembly according to an example embodiment.

In the lens assembly 20 according to an example embodiment, the meta lens 100 may be provided to mainly contribute to primary chromatic aberration correction. According to an example embodiment, as illustrated in FIG. 5, the meta lens 100 may include a first meta lens ML1 and a second meta lens ML2.

For example, in the first meta lens ML1, a first shape distribution of a plurality of first nanostructures NS1 may be determined so that the first meta lens ML1 has a first phase delay function $\varphi_1(r)$ indicating positive refractive power. In the second meta lens ML2, a second shape distribution of a plurality of second nanostructures NS2 may be determined so that the second meta lens ML2 has a second phase delay function $\varphi_2(r)$ indicating negative refractive power. According to an example embodiment, the first phase delay function $\varphi_1(r)$ and the phase delay function $\varphi_1(r)$ may be a predetermined phase delay function.

As described above, referring to FIG. 1, in the lens assembly 20 according to an example embodiment, the first refractive lens 21 may be formed of a low-dispersion material to have positive refractive power, the second refractive lens 25 may be formed of a high-dispersion material to have negative refractive power, and the meat lens 100 may be provided to correct chromatic aberration. In this case, the first refractive lens 21 may mainly serve as a focusing function for imaging light. At least one of the second refractive lens 25 and the meta lens 100 may mainly serve to correct chromatic aberration. For example, the meta lens 100 may be provided to mainly contribute to primary chromatic aberration correction, and the second refractive lens 25 may be provided to correct secondary chromatic aberration.

For example, the lens assembly 20 according to an example embodiment may include the first refractive lens 21, the second refractive lens 25, and the meta lens 100, thereby mainly focusing light by the first refractive lens 21, mainly correcting primary chromatic aberration by the meta lens 100, and correcting secondary chromatic aberration by the second refractive lens 25.

The lens assembly 20 according to this embodiment may implement a telephoto lens as a hybrid lens assembly in which a refractive lens and a meta lens are coupled, and may implement a hybrid telephoto camera when applied to an imaging apparatus as an imaging optical system. When having an optical configuration as illustrated in FIG. 1, the lens assembly 20 according to an example embodiment may be designed to have a magnification corresponding to a telephoto lens, for example, 2 or more to 20 or less, or a magnification of 20 or more, and the imaging apparatus 10 to which the lens assembly 20 is applied may implement, for example, a telephoto camera.

Meanwhile, FIG. 1 shows an example in which the lens assembly 20 according to an example embodiment forms a vertical optical module structure, and may further include an optical element that bends a light traveling path to have a folded optical module structure.

Figure 2:
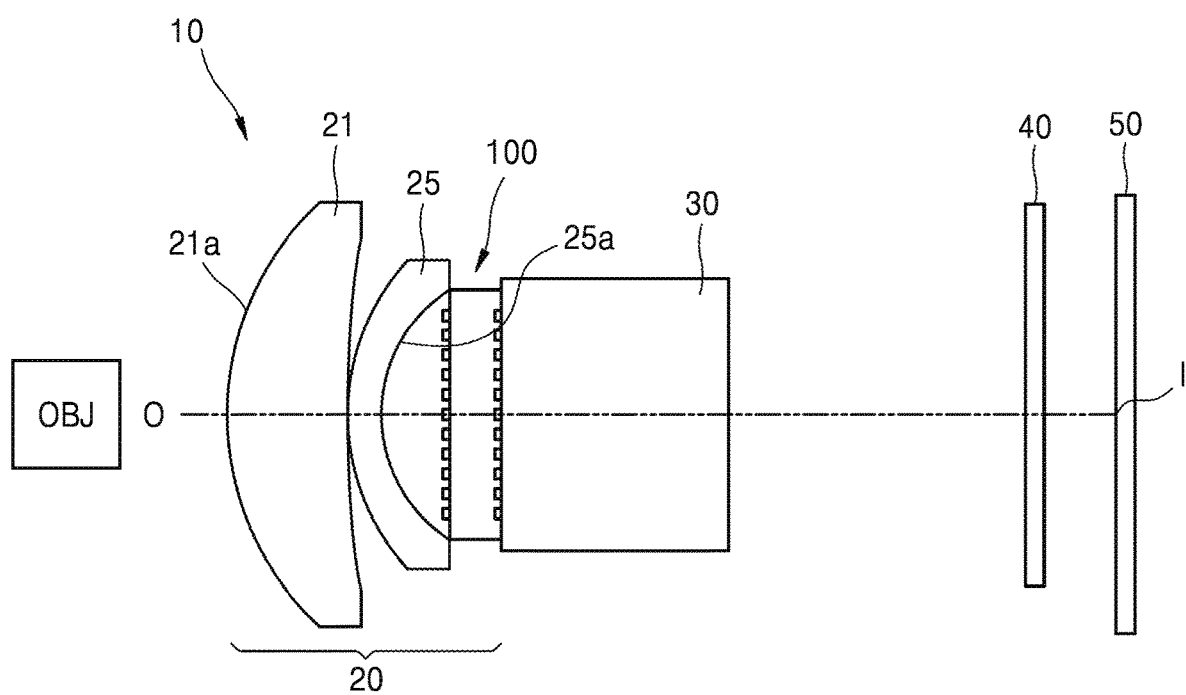
FIGS. 2 and 3 schematically illustrate a modified example of an optical configuration of a lens assembly according to an example embodiment and an imaging apparatus including the lens assembly.
Figure 3:
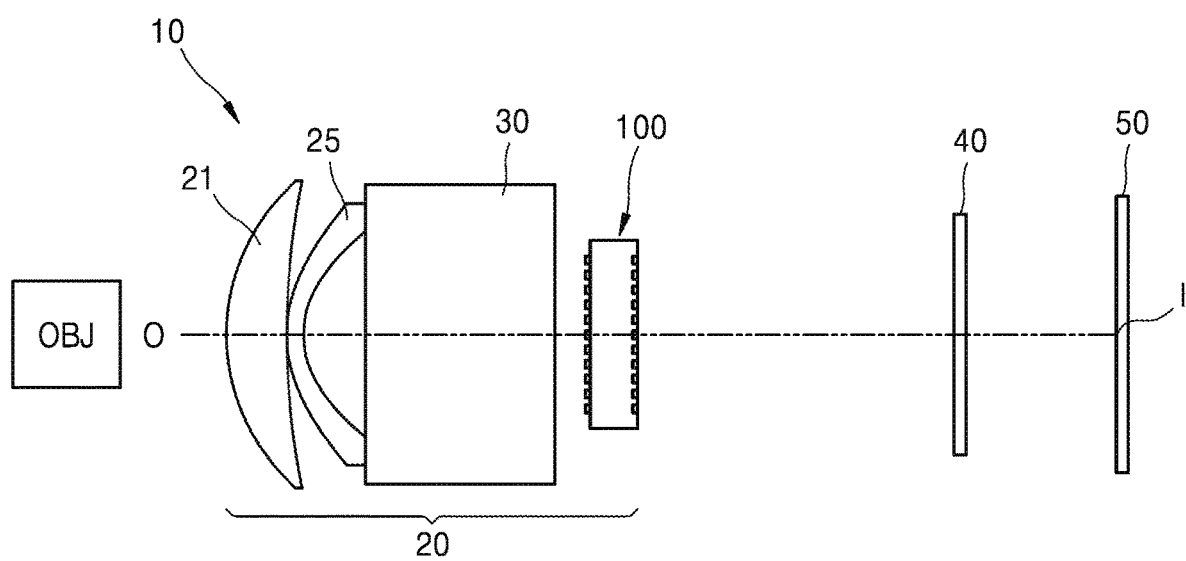
Figure 4:
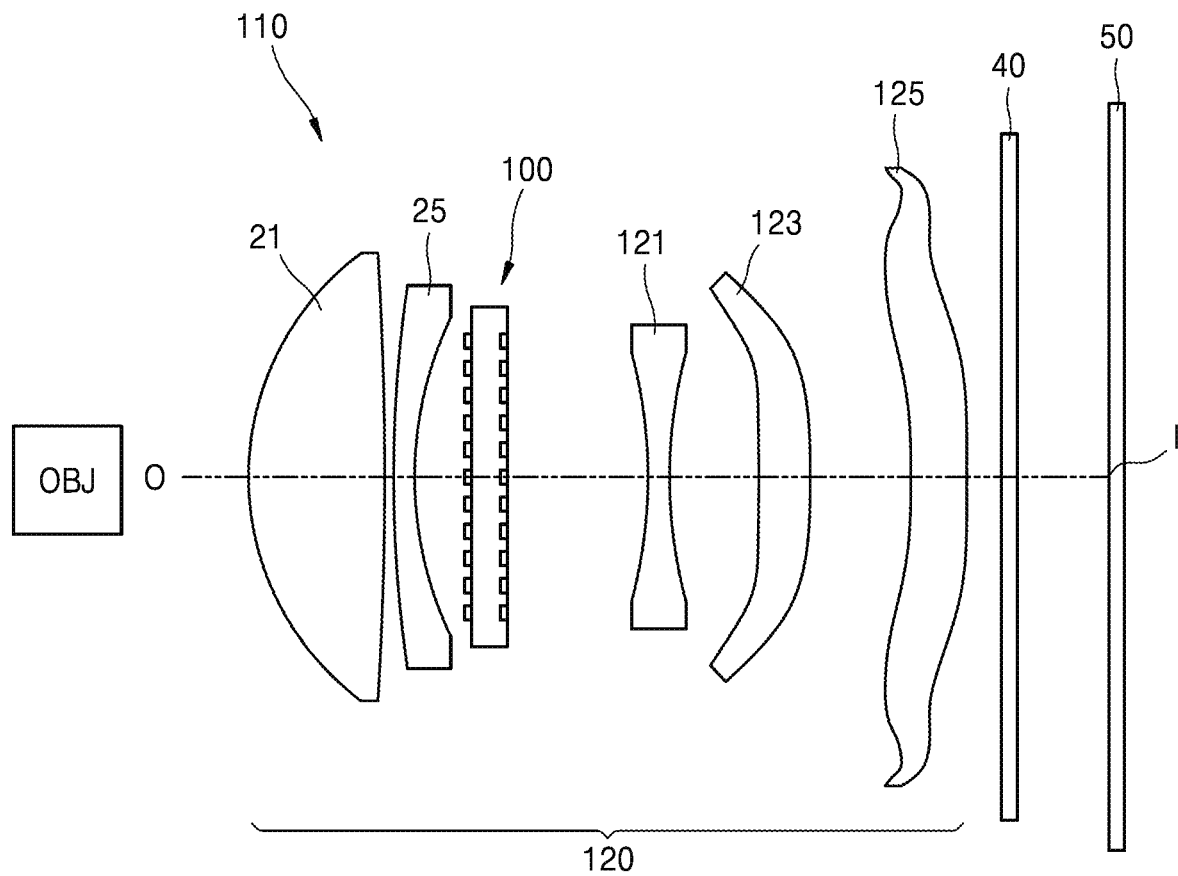
FIG. 4 schematically illustrates an optical configuration of a lens assembly and an imaging apparatus including the lens assembly according to another embodiment.

As illustrated in FIGS. 2 to 4, the lens assembly 20 according to an example embodiment may further include an additional lens and/or an optical element between the second refractive lens 25 and the meta lens 100, or before or after the same.

FIGS. 2 and 3 schematically illustrate a modified example of an optical configuration of a lens assembly 20 according to an example embodiment and an imaging apparatus 10 to which the lens assembly is applied. Compared with the lens assembly 20 according to the embodiment of FIG. 1, FIGS. 2 and 3 illustrate an example in which an optical element 30 is further provided to form a folded optical system by bending the traveling direction of light.

For example, as in the embodiment of FIGS. 2 and 3, the lens assembly 20 according to an example embodiment may further include an optical element 30, for example, a prism or a reflective member that bends a traveling path of light in the middle of the lens assembly 20. Here, although it is described that the optical element 30 that bends the light traveling path is included in the lens assembly 20, the disclosure is not limited thereto. The optical element 30 that bends the light traveling path may or may not be regarded as a component of the lens assembly 20 according to another example embodiment.

As shown in FIG. 2, according to an example embodiment, the optical element 30 may be arranged between the meta lens 100 and the image plane. However, the disclosure is not limited thererto, and as such, according to another example embodiment, as shown in FIG. 3, the optical element 30 may be arranged between the second refractive lens 25 and the meta lens 100.

As shown in FIGS. 2 and 3, when the optical element 30 is arranged between the meta lens 100 and the image plane or between the second refractive lens 25 and the meta lens 100, a folded optical system may be configured and thus a folded telephoto camera (or a folded telephoto camera module) in the form of a periscope may be implemented.

Referring to FIGS. 1 and 2, arrangement and design of the first refractive lens 21, the second refractive lens 25, and the meta lens 100 may vary when the optical element 30, for example, a prism, bending a traveling direction of light is provided between the meta lens 100 and the image plane, and thus a magnification may vary.

Also, referring to FIGS. 2 and 3, arrangement and design of the first refractive lens 21, the second refractive lens 25, and the meta lens 100 may vary depending on a position where the optical element 30, for example, the prism for bending a traveling direction of light is arranged, and thus a magnification may vary.

When the lens assembly 20 has an optical configuration illustrated in FIG. 2, for example, an imaging apparatus such as a folded telephoto camera having a magnification of about 3 to 7 times may be implemented. When the lens assembly 20 has an optical configuration illustrated in FIG. 3, for example, an imaging apparatus such as a folded telephoto camera having a magnification of about 4 to 15 times may be implemented.

FIG. 4 schematically illustrates an optical configuration of a lens assembly 120 according to an example embodiment and an imaging apparatus 110 including the lens assembly 120. The lens assembly 120 of FIG. 4 further includes an additional refractive lens between the meta lens 100 and the image plane as compared with the lens assembly 20 according to the embodiment of FIGS. 1 to 3. The number of additional refractive lenses may vary according to various example embodiment.

Referring to FIG. 4, the lens assembly 120 according to an example embodiment may further include, between the meta lens 100 and the image plane, at least one refractive lens for focusing light incident at a large incident angle on an image plane. FIG. 4 illustrates an example of further including a third refractive lens 121, a fourth refractive lens 123 and a fifth refractive lens 125 as additional refractive lenses between the meta lens 100 and the image plane. The number of additional refractive lenses may vary.

As shown in FIG. 4, when at least one refractive lens, for example, the third refractive lens 121, the fourth refractive lens 123 and the fifth refractive lens 125, are further included between the meta lens 100 and the image plane, a telephoto imaging apparatus, such as a direct type telephoto camera, may be implemented, and imaging apparatuses such as such a direct type telephoto camera may be provided to have a magnification of about two to four times.

As shown in FIGS. 2 and 3, the lens assembly 120 of FIG. 4 may further include an optical element 30 between the meta lens 100 and the image plane or between the second refractive lens 25 and the meta lens 100. For example, the optical element 30 may be further provided between the meta lens 100 and the third refractive lens 121, or the optical element 30 may be further provided between the second refractive lens 25 and the meta lens 100. However, the disclosure is not limited thereto, and as such, according to another example embodiment the optical element 30 may be provided between the third refractive lens 121, the fourth refractive lens 123 and the fifth refractive lens. According to an example embodiment, the optical element 30 may be a prism or a reflective member that bends a traveling path of light. As in the lens assembly 120 of FIG. 4, even when at least one refractive lens is further included between the meta lens 100 and the image plane, the optical element 30 for bending a traveling path of light may be further included, and thus an imaging apparatus such as a folded telephoto camera may be implemented.

FIG. 5 is a cross-sectional view schematically illustrating a configuration of a meta lens 100 applied to the lens assembly 20 (FIGS. 1, 2 and 3) and the lens assembly 120 (FIG. 4) according to various example embodiments described above. FIG. 5 illustrates an example of the meta lens 100 applied to the lens assembly 20 and the lens assembly 120 according to the embodiments, but the disclosure is not limited thereto.

Referring to FIG. 5, the meta lens 100 according to an example embodiment may include a first meta lens ML1 and a second meta lens ML2. The first meta lens ML1 may include a plurality of first nanostructures NS1, and the second meta lens ML2 may include a plurality of second nanostructures NS2. The meta lens 100 may include a spacer 101 between the first meta lens ML1 and the second meta lens ML2.

According to another example embodiment, the meta lens 100 may include only one of the first meta lens ML1 and the second meta lens ML2. In addition, the meta lens 100 may include the first meta lens ML1 and the second meta lens ML2, and the first meta lens ML1 and the second meta lens ML2 may be separated from each other. Hereinafter, it is exemplarily described that the first meta lens ML1 is provided on one surface of the spacer 101 and the second meta lens ML2 is provided on the other surface thereof, but the example embodiment is not limited thereto.

The first meta-lens ML1 may include an array of a plurality of first nanostructures NS1 having a shape dimension less than an operating wavelength, and having widths varying according to positions. The second meta-lens ML2 may include an array of a plurality of second nanostructures NS2 having a shape dimension less than an operating wavelength, and having widths varying according to positions. According to an example embodiment, the shape dimension of a nanostructure may be a length, a width, a height or a diameter of the nanostructure.

In this way, the plurality of first nanostructures NS1 have a first shape distribution and form the first meta lens ML1, and the plurality of second nanostructures NS2 have a second shape distribution and form the second meta lens ML2. The first shape distribution and the second shape distribution may be determined according to the phase delay functions $\varphi_1(r)$ to be represented by the first meta lens ML1 and the phase delay function $\varphi_2(r)$ to be represented by the second meta lens ML2. The phase delay functions $\varphi_1(r)$ and $\varphi_2(r)$ may be determined in consideration of optical performance to be implemented by the meta lens 100 including the first meta lens ML1, the second meta lens ML2, and a combination thereof.

For example, in the first meta lens ML1, the first shape distribution of a plurality of first nanostructures NS1 may be determined to have a predetermined phase delay function $\varphi_1(r)$ indicating positive refractive power. For example, in the second meta lens ML2, the second shape distribution of a plurality of second nanostructures NS2 may be determined to have a predetermined phase delay function $\varphi_2(r)$ indicating negative refractive power.

The first nanostructure NS1 has a width W1 and a height H1, and these values may vary depending on the position of the first nanostructure NS1. The second nanostructure NS2 has a width W2 and a height H2, and these values may vary depending on the position of the second nanostructure NS2. For example, a first first nanostructure NS1-1, which is closer to or at a center of the first meta lens ML1 may have a first width W1 and/or a first height H1 different from a second first nanostructure NS1-2, which is away from the center and/or closer to the periphery of the first meta lens ML1. Moreover, a first second nanostructure NS2-1, which is closer to or at a center of the second meta lens ML2 may have a second width W2 and/or a second height H2 different from a second second nanostructure NS2-2, which is away from the center and/or closer to the periphery of the second meta lens ML2.

Although the first nanostructure NS1 and the second nanostructure NS2 have been illustrated to have the same height, the disclosure is not limited thereto, and as such, according to another example embodiment the height of the first nanostructure NS1 and/or the second nanostructure NS2 may vary according to a positions of the respective nanostructure in the meta lens. All of the plurality of first nanostructures NS1 may have the same height, and all of the plurality of second nanostructures NS2 may have the same height different from that of the plurality of first nanostructures NS1.

Meanwhile, the first meta lens ML1 may further include a first peripheral material EN1 surrounding the first nanostructures NS1. The second meta lens ML2 may further include a second peripheral material EN2 surrounding the second nanostructure NS2.

Each of the first and second nanostructures NS1 and NS2 may be provided to have a refractive index higher or lower by 0.5 or more than those of the first and second peripheral materials EN1 and EN2. That is, the difference in refractive indices between the first peripheral material EN1 and the first nanostructure NS1 may be 0.5 or more, and the difference in refractive indices between the second peripheral material EN2 and the second nanostructure NS2 may be 0.5 or more.

For example, the first nanostructure NS1 may be formed of a high refractive material, and the first peripheral material EN1 may be formed of a low refractive material, or the first nanostructure NS1 may be formed of a low refractive material, and the first peripheral material EN1 may be formed of a high refractive material. According to an example embodiment, the high refractive material may have a refractive value higher than a reference value of the low refractive material. According to an another example embodiment, the high refractive material may have a refractive value higher than a reference value and the low refractive material may have a refractive value lower than a reference value. In addition, the second nanostructure NS2 may be formed of a high refractive material, and the second peripheral material EN2 may be formed of a low refractive material, or the second nanostructure NS2 may be formed of a low refractive material, and the second peripheral material EN2 may be formed of a high refractive material.

In this way, two of the first nanostructure NS1, the second nanostructure NS2, the first peripheral material EN1, and the second peripheral material EN2 may be formed of a high refractive material, and the other two may be formed of a low refractive material.

In this case, the high refractive material may include, for example, c-Si, p-Si, a-Si, III-V compound semiconductors (GaP, GaN, GaAs, etc.), SiC, $TiO_2$, $TiSiO_x$, SiN, etc. In addition, the low refractive material may include, for example, a polymer material such as SU-8, PMMA, etc., $SiO_2$, or SOG or air.

The spacer 101 supports the first meta lens ML1 and the second meta lens ML2, and the difference in refractive index between the spacer 101 and the first nanostructure NS1, and/or the spacer 101 and the second nanostructure NS2 may be, for example, 0.5 or more. A refractive index of the first nanostructure NS1 and/or the second nanostructure NS2 may be higher or lower than a refractive index of the spacer 101.

The spacer 101 may be formed of a relatively low refractive material other than air. The spacer 101 may be formed of the same material as or different material from the first peripheral material EN1 and/or the second peripheral material EN2. The spacer 101 may be a substrate that is transparent with respect to an operating wavelength of the meta lens 100, and may be made of any one of materials among glass (fused silica, BK7, etc.), Quartz, polymer (PMMA, SU-8, etc.), and plastic, or may be a semiconductor substrate.

The thickness of the spacer 101 may be determined to have a predetermined interval d set between the first meta lens 100 and the second meta lens 100.

In the meta lens 100 according to an example embodiment, the spacer 101 may correspond to a substrate on which a first meta lens ML1 and a second meta lens ML2 are formed on both surfaces thereof, respectively.

Meanwhile, in the first meta lens ML1 and the second meta lens ML2, the first and second nanostructures NS1 and NS2 may correspond to meta-atoms forming the meta lens 100. That is, the meta lens 100 according to an example embodiment may be formed of an array of meta-atoms having a width less than an operating wavelength. The meta-atoms may be arranged on a hexagonal lattice or a rectangular lattice. The spacing of the lattices of the meta-atoms may be, for example, about ⅔ or less of the minimum wavelength of the light being imaged. In addition, the height of the meta-atoms may be about ½ or more of the minimum wavelength of the light to be imaged.

In order to implement the meta-atoms, the first and second nanostructures NS1 and NS2 may include a refractive material having a higher refractive index than the first and second peripheral materials EN1 and EN2 or a material having a lower refractive index than the first and second peripheral materials EN1 and EN2. For example, the first nanostructure NS1 may include a high refractive material having a higher refractive index or a lower refractive material having a lower refractive index than the first peripheral material EN1. Moreover, the second nanostructure NS2 may include a high refractive material having a higher refractive index or a lower refractive material having a lower refractive index than the second peripheral material EN2. In addition, cross-sections of the first and second nanostructures NS1 and NS2 may have various shapes such as a symmetrical shape such as a circular shape and a square shape, or a non-symmetrical shape such as an oval shape, a rectangular shape, an L shape, and the like, or may have a structure of a cross shape or two or more separate sub-nanostructures. In addition, the first and second nanostructures NS1 and NS2 may have, for example, a length of about ½ or more and about 8 times or less, of the minimum wavelength of light to be imaged.

That is, the first meta lens ML1 may include the plurality of first nanostructures NS1 having a first shape distribution to implement the phase delay function $\varphi_1(r)$, and the second meta lens ML2 may include the plurality of second nanostructures NS2 having a second shape distribution to implement the phase delay function $\varphi_2(r)$.

The first nanostructure NS1 and the second nanostructure NS2 may have a shape dimension of a sub-wavelength less than an operation wavelength of the first meta lens ML1 and the second meta lens ML2, that is, the shortest wavelength of a plurality of spaced wavelength bands. The operating wavelength band may be, for example, a visible light band. The heights of the first nanostructure NS1 and the second nanostructure NS2 may be greater than an operating wavelength of the first meta lens ML1 and the second meta lens ML2, that is, the shortest wavelength $\lambda_m$ among a plurality of spaced wavelength bands. The height range may be, for example, 0.5 to 6 times (e.g., $0.5\lambda_m$ to $6.0\lambda_m$) of the wavelength $\lambda_m$.

Meanwhile, as illustrated in FIG. 5, the surfaces of the first peripheral material EN1 and the second peripheral material EN2 may be flat to have the same thickness as the first nanostructure NS1 and the second nanostructure NS2, but the disclosure is not limited thereto. For example, the first peripheral material EN1 and the second peripheral material EN2 may be formed to completely cover the first nanostructure NS1 and the second nanostructure NS2, and in this case, surfaces of the first peripheral material EN1 and the second peripheral material EN2 may be formed to be flat or have a curved shape. For example, the first meta lens ML1 may have positive refractive power, the surface of the first peripheral material EN1 with respect thereto may have a convex shape, the second meta lens ML2 may have negative refractive power, and the surface of the second peripheral material EN2 with respect thereto may have a concave shape. In addition, one of the surface of the first peripheral material EN1 and the surface of the second peripheral material EN2 may be a concave or convex curved surface, and the other may be flat.

Figure 6:
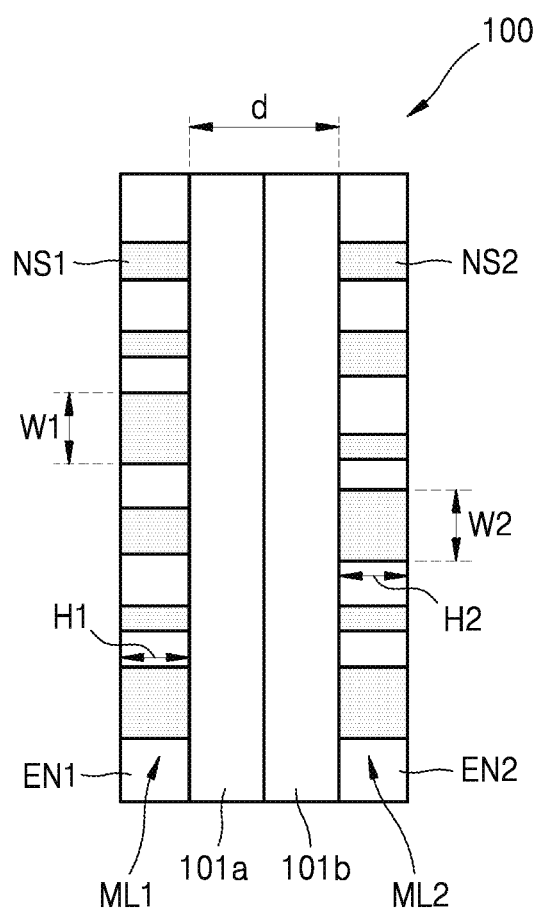
FIG. 6 is a cross-sectional view schematically illustrating another configuration of a meta lens included in a lens assembly according to an example embodiment.

FIG. 6 is a cross-sectional view schematically illustrating another configuration of a meta lens 100 applied to the lens assembly 20 and the lens assembly 120 according to various example embodiments described above.

Referring to FIG. 6, in the meta lens 100 according to an example embodiment, the first meta lens ML1 and the second meta lens ML2 may be formed on the support layers 101a and 101b, for example, substrates, respectively, and a back surface of a surface on which a nano-structure NS1 of the first meta lens ML1 is arranged and a back surface of a surface on which a second nanostructure NS2 of the second meta lens ML2 is arranged may be bonded to each other. Like the spacer 101 in FIG. 5, the support layers 101a and 101b on which the first meta lens ML1 and the second meta lens ML2 are respectively formed may be formed of a relatively low refractive material other than air. The support layers 101a and 101b may be formed of the same material as or different material from the first peripheral material EN1 and/or the second peripheral material EN2. The support layers 101a and 101b may be a substrate that is transparent with respect to an operating wavelength of the meta lens 100, and may be made of any one of materials among glass (fused silica, BK7, etc.), Quartz, polymer (PMMA, SU-8, etc.), and plastic, or may be a semiconductor substrate.

According to an example embodiment, the sum of the thickness of the support layer 101a on which the first meta lens ML1 is formed and the thickness of the support layer 101b on which the second meta lens ML2 is formed may be, for example, determined to have the distance d set between the first meta lens ML1 and the second meta lens ML2, that is, the thickness of the spacer 101, in FIG. 5.

Figure 7:
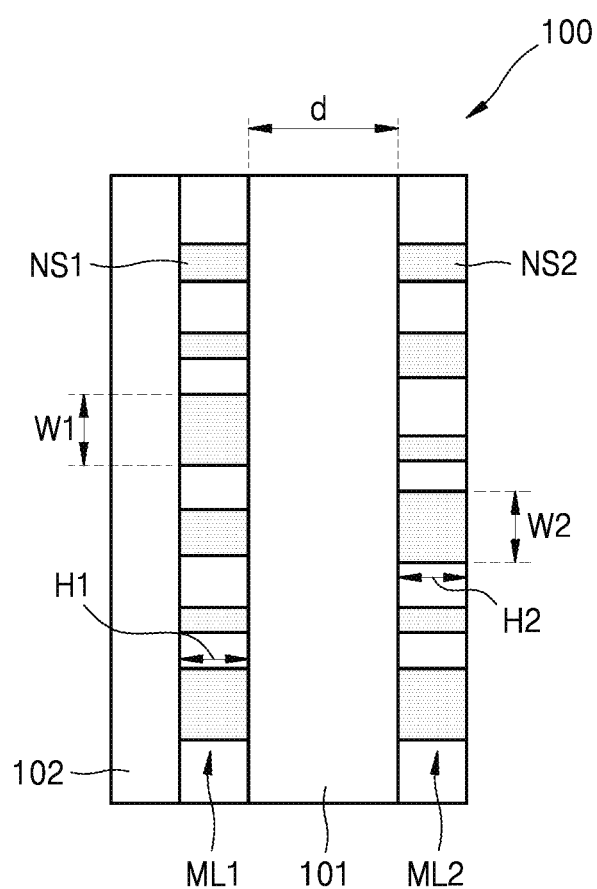
FIG. 7 is a cross-sectional view schematically illustrating another configuration of a meta lens included in a lens assembly according to various example embodiments.

FIG. 7 is a cross-sectional view schematically illustrating another configuration example of a meta lens 100 including in the lens assembly 20 or the lens assembly 120 described above according to various example embodiments.

Referring to FIG. 7, the meta lens 100 according to an example embodiment may be formed in a structure in which, for example, the first nanostructure NS1 of the first meta lens ML1 is formed on a support layer 102, the first peripheral material EN1 surrounding the first nanostructure NS1 of the first meta lens ML1 is formed, the spacer 101 is formed on the first meta lens ML1, and the second nanostructure NS2 of the second meta lens ML2 and the second peripheral material EN2 surrounding the second nanostructure NS2 are formed on the spacer 101. In this case, the thickness of the spacer 101 extending from the upper end of the first nanostructure NS1 to the second nanostructure NS2 may be formed to satisfy a set distance d between the first metalloid ML1 and the second metalloid ML2. Here, instead of the spacer 101, for example, the first peripheral material EN1 may be formed to cover the first nanostructure NS1. In this case, a thickness of the first peripheral material EN1 covering the first nanostructure NS1, that is, a thickness from an upper end of the first nanostructure NS1 to the second nanostructure NS2 may satisfy a set distance d between the first meta-lens ML1 and the second meta lens ML2.

Meanwhile, FIGS. 5 to 7 illustrate an example in which each of the first nanostructures NS1 of the first meta lens ML1 and the second nanostructures NS2 of the second meta lens ML2 is arranged in a single layer, but the disclosure is not limited thereto. For example, at least one of the first nanostructures NS1 of the first meta lens ML1 and the second nanostructures NS2 of the second meta lens ML2 may be arranged in a two-layer structure or a multi-layer structure of three or more layers.

As described above, the lens assembly 20 of imaging apparatus 10 and the lens assembly 120 of imaging apparatus 110 include at least one meta lens 100, for example, a first meta lens ML1 and/or a second meta lens ML2, and each of the first and second meta lenses ML1 and ML2 is provided to implement a predetermined phase profile. Hereinafter, an example structure of the meta lens ML applicable to the first meta lens ML1 and/or the second meta lens ML2 will be described with reference to FIGS. 8A to 10.

Figure 8A:
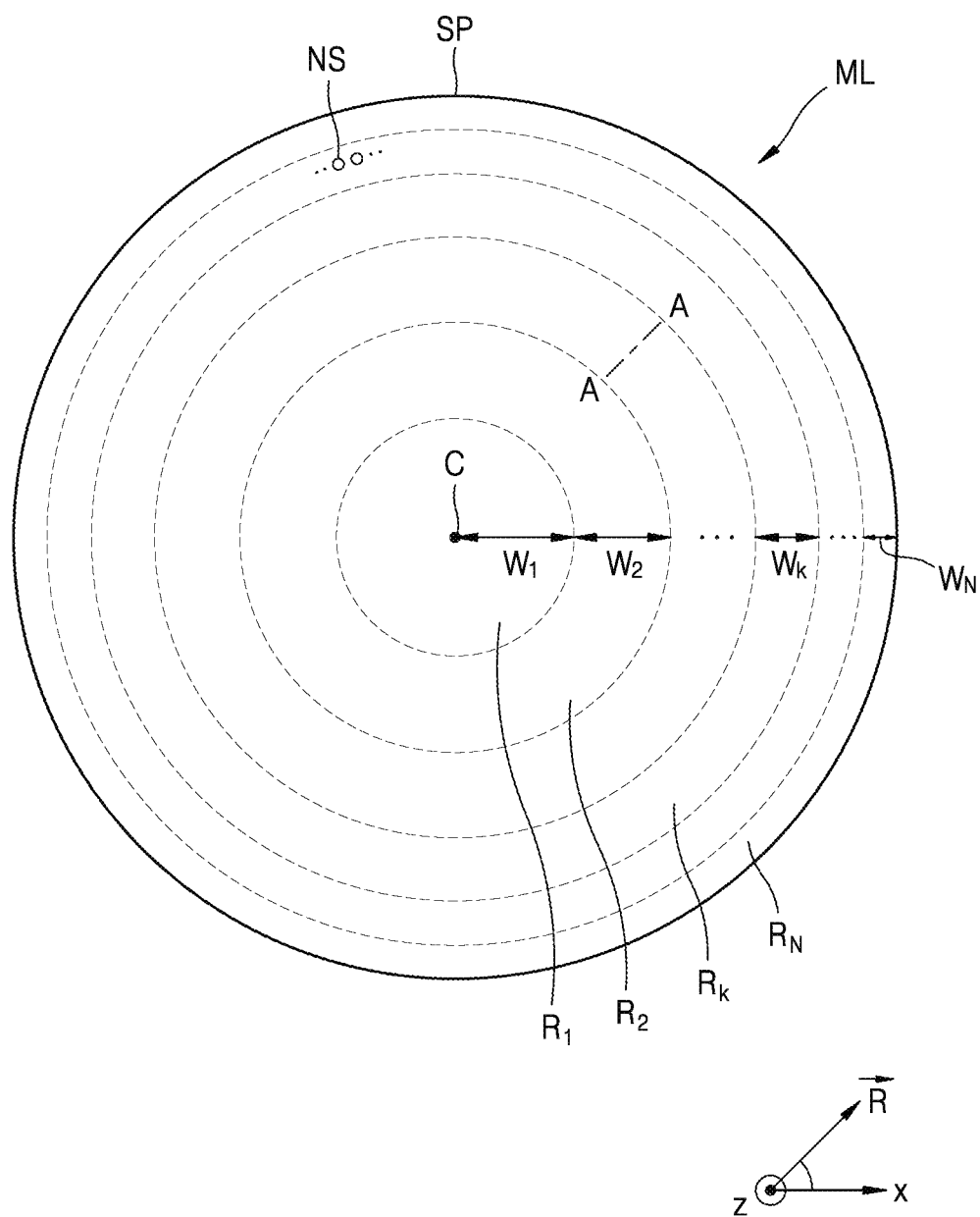
FIG. 8A is a plan view showing a schematic structure of a meta lens included in a lens assembly according to an example embodiment.
Figure 8B:
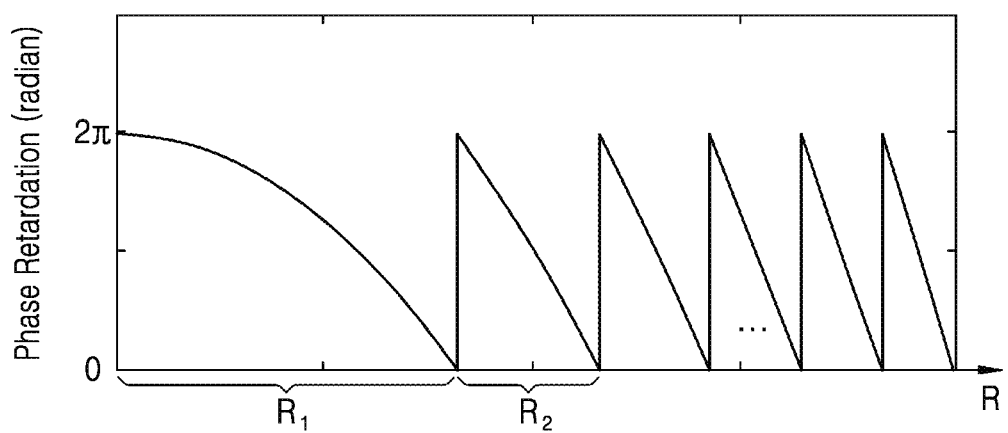
FIG. 8B illustrates an example of a phase profile implemented for each region of FIG. 8A.

FIG. 8A is a plan view showing a schematic structure of a meta lens applied to a lens assembly 20 or a lens assembly 120 according to an example embodiment. FIG. 8B illustrates an example of a phase profile implemented for each region of FIG. 8A. The meta lens ML of FIG. 8A may correspond to a plan view of the first meta lens ML1 and/or the second meta lens ML2 described above.

Referring to FIGS. 8A and 8B, the meta lens ML according to an example embodiment includes a plurality of nanostructures NS to show a predetermined phase delay profile for incident light. The nanostructures NS may be arranged on a support layer SP. The nanostructures NS may correspond to the first nanostructures NS1 of the first meta lens ML1 and the second nanostructures NS2 of the second meta lens ML2 illustrated in FIGS. 5 to 7. The support layer SP may correspond to the spacer 101 illustrated in FIG. 5, the support layers 101a and 101b in FIG. 6, and the support layer 102 or the spacer 101 in FIG. 7. The nanostructure NS may have a shape dimension less than the center wavelength $\lambda_0$ of the operating wavelength band. The nanostructure NS may have a shape dimension of a sub-wavelength less than the minimum wavelength $\lambda_m$ of the operating wavelength band. The operating wavelength band may be a visible light band. The nanostructure NS may have a refractive index different from those of the support layer SP and/or other peripheral materials. The meta lens ML may implement various phase profiles for incident light according to an arrangement shape of the nanostructures NS, and may be applied as the first meta lens ML1 and/or the second meta lens ML2 as described above.

The meta lens ML may include a plurality of phase modulation regions $R_k$ including a plurality of nanostructures NS having a shape, size, and arrangement determined according to design conditions, and the plurality of phase modulation regions $R_k$ may be concentrically arranged to exhibit refractive power serving as a lens.

The plurality of phase modulation regions $R_k$ are arranged in the radial direction R from the center C of the meta lens ML, and the width $W_K$ of the plurality of phase modulation regions $R_k$ may become smaller as the distance from the center. Each of a plurality of phase modulation regions $R_k$ may be an area representing a phase modulation pattern in a predetermined range. The plurality of phase modulation region $R_k$ includes a first region $R_1$, a second region $R_2$, ..., an $N^{th}$ region $R_N$ which are arranged in order in the radius direction R from the center C of the meta lens ML. As shown, the first region $R_1$ may be a circular region, and the second region $R_2$ to the $N^{th}$ region $R_N$ may be an annular region. The first to $N^{th}$ regions R1 to RN are regions indicating a phase delay in a predetermined range, and the phase modulation range may be, for example, $2\pi$. However, this is exemplary and the embodiment is not limited thereto. Total number of phase modulation regions N, width of each of the regions $W_1, \ldots, W_k, \ldots, W_N$ may be determined according to refractive power (focal length) and a lens diameter.

The number and a distribution of widths of the phase modulation regions $R_k$ is associated with the effective diameter and the magnitude (absolute value) of the refractive power, of the meta lens ML and the sign of the refractive power may be determined according to the rule in each region $R_k$. For example, further narrow region $R_k$ may be used as the refractive power is larger, and positive refractive power may be implemented by an array of rules in which the size of nanostructures NS decreases in the radial direction in each region $R_k$ (an array in which a phase decreases), and negative refractive power may be implemented by an array of rules in which the size of nanostructures NS increases in the radial direction (an array in which a phase increases).

Figure 9:
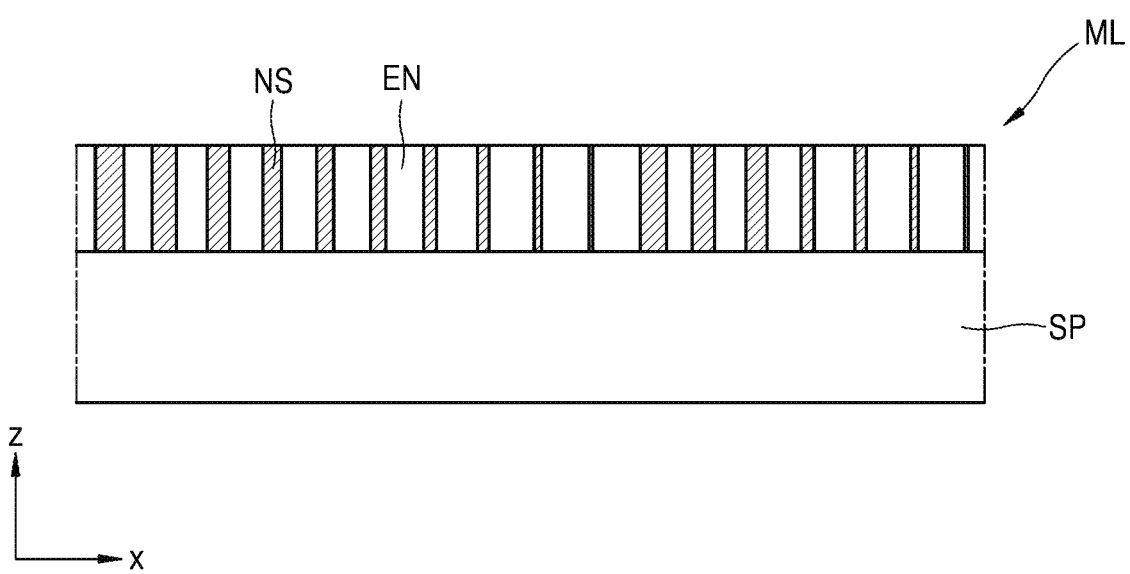
FIGS. 9 and 10 show cross-sectional views of examples of the meta lens of FIG. 8.
Figure 10:
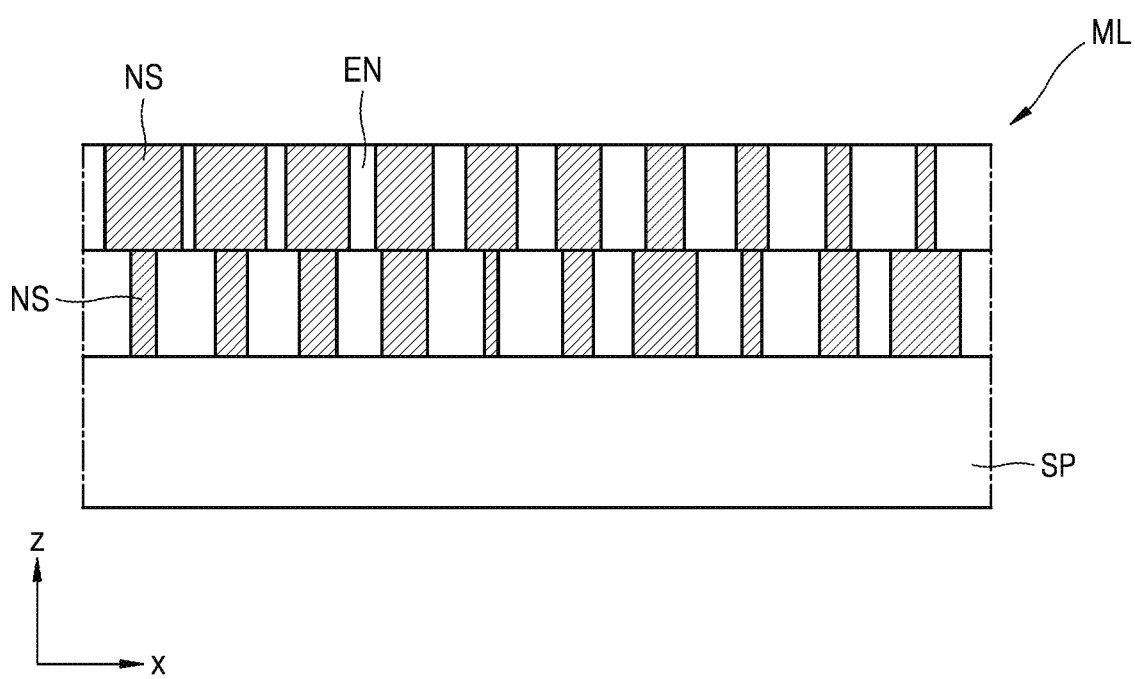

FIGS. 9 and 10 show cross-sectional views of examples of the meta lens ML of FIG. 8A.

The meta lens ML may include a support layer SP and a plurality of nanostructures NS arranged on the support layer SP. A peripheral material EN made of a material having a refractive index different from those of the nanostructures NS may be formed between the plurality of nanostructures NS. According to another example embodiment, the peripheral material EN may be formed to have a height higher than that of the nanostructure NS, that is, to cover an upper end of the nanostructure NS. The nanostructures NS may be arranged in a single layer as illustrated in FIG. 9, or may be arranged in two layers as illustrated in FIG. 10, or in three or more layers.

The support layer SP may have a transparent property with respect to light in an operating wavelength band of the meta lens ML, and may be made of any one of materials among glass (fused silica, BK7, etc.), Quartz, polymer (PMMA, SU-8, etc.), and other transparent plastics.

The nanostructures NS may be made of a material having a difference in refractive index from peripheral materials such as the peripheral material EN and support layers SP. The nanostructures NS may have a high refractive index with a difference of 0.5 or more from the refractive index of the peripheral material EN, or a low refractive index with a difference 0.5 or more from the refractive index of peripheral materials. The difference in refractive index may be 0.5 or less, for example, 0.2 or more and 0.5 or less.

When the nanostructures NS are formed of a material having a refractive index higher than that of the peripheral material EN, the nanostructures NS may include at least one of c-Si, p-Si, a-Si, III-V compound semiconductors (GaP, GaN, GaAs, etc.), SiC, $TiO_2$, $TiSiO_x$, and SiN, and the peripheral substance EN of the low-refractive index may include polymer materials such as SU-8 and PMMA, $SIO_2$, SOG or air.

When the nanostructures NS are formed of a material having a refractive index lower than that of the peripheral material EN, the nanostructure NS may include at least one of $SIO_2$ and air and the peripheral material EN having a high refractive index may include at least one of c-Si, p-Si, a-Si, III-V compound semiconductor (GaP, GaN, GaAs), SiC, $TiO_2$, $TiSiO_x$, and SiN.

The nanostructures NS may have a shape dimension less than the operating wavelength of the imaging apparatuses 10 and 110 to which the lens assembly 20 and the lens assembly 120 according to above-described various example embodiments are respectively applied and an electronic apparatus including the same, that is, the minimum wavelength $\lambda_m$ of imaging light formed by the imaging apparatuses 10 and 110. For example, the width of the nanostructure NS may be ½ or more and ⅔ or less of the minimum wavelength $\lambda_m$. The height of the nanostructure NS may range from $0.5\lambda_m$ to $8\lambda_m$.

The nanostructure NS may have a cylindrical shape, and other shapes such as various polygonal pillars, elliptical pillars, etc. For example, cross-section of the nanostructure NS may have various shapes such as a symmetrical shape such as a circular shape and a square shape, or a non-symmetrical shape such as an oval shape, a rectangular shape, an L shape, and the like, or may have a structure of a cross shape or two or more separate sub-nanostructures.

In the lens assembly 20 and the lens assembly 120 according to the example embodiments, the first meta lens ML1 may have a structure of the meta lens ML as described with reference to FIGS. 8A, 8B, 9 and 10, and the first shape distribution of the plurality of first nanostructures NS1 in each phase modulation region $R_k$ of the first meta lens ML1 may be predetermined to have, for example, a predetermined phase delay function $\varphi_1(r)$ indicating positive refractive power. In addition, the second meta lens ML2 may have a structure of the meta lens ML as described with reference to FIGS. 8A to 10, and the second shape distribution of the plurality of second nanostructures NS2 in each phase modulation region $R_k$ of the second meta lens ML2 may be determined to have, for example, a predetermined phase function $\varphi_2(r)$ indicating negative refractive power.

Hereinafter, a design example of a lens assembly according to an example embodiment will be described as an example of an optical configuration of the lens assembly 20 illustrated in FIG. 2.

Figure 11:
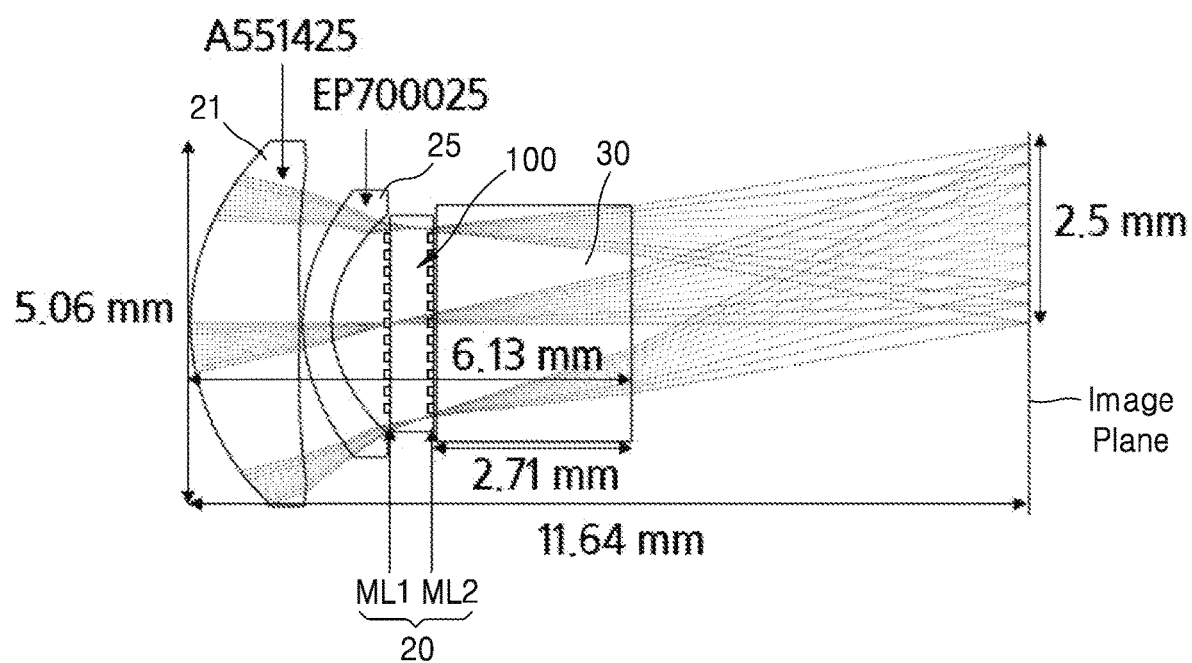
FIG. 11 shows focusing of light according to an incident direction when designing a lens assembly according to an example embodiment based on the design data of Tables 1 to 6.
Figure 12A:
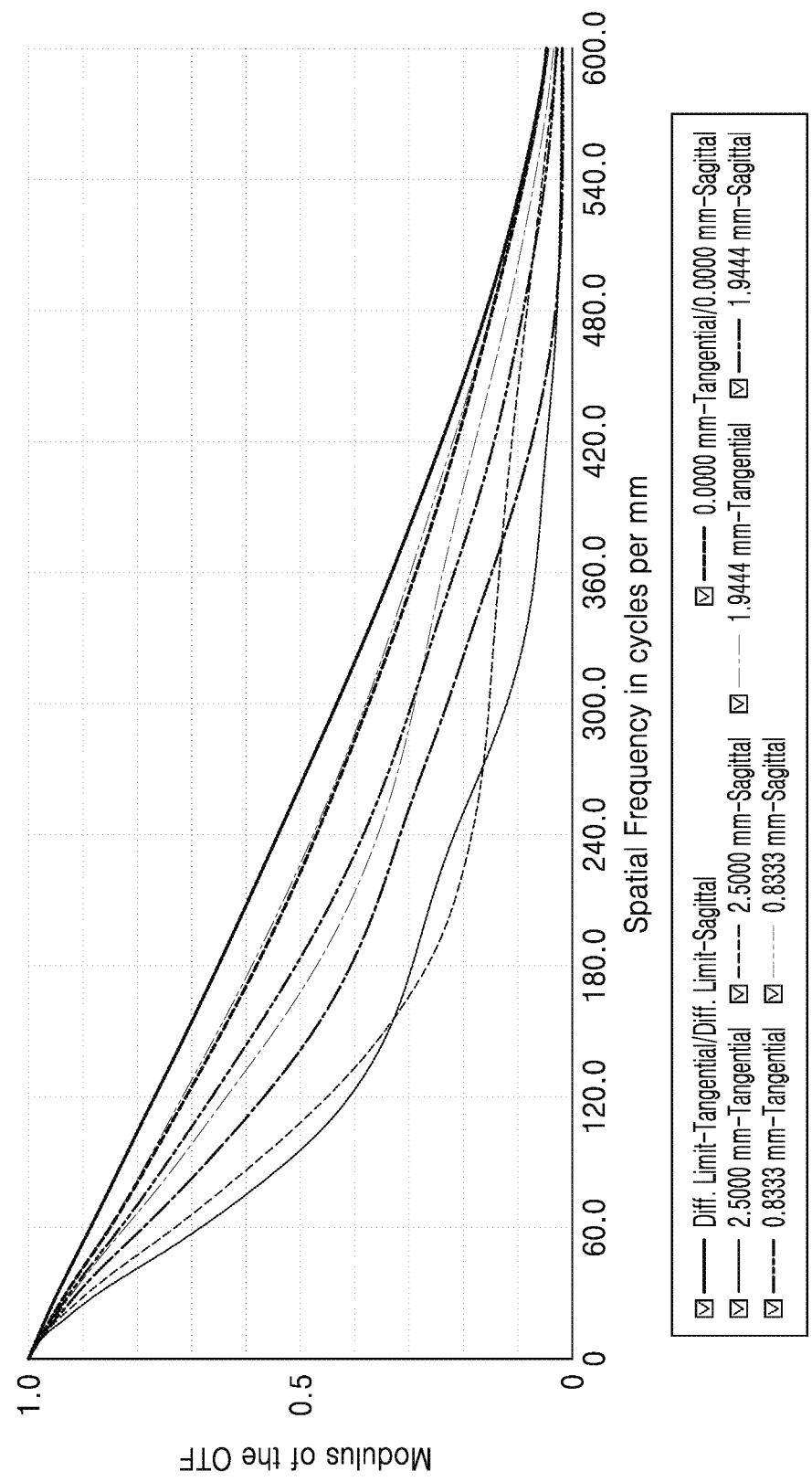
FIGS. 12A and 12B show the modulus of the optical transfer function (OTF) performance of a lens assembly according to an example embodiment, when designed as shown in Table 1 to Table 6 and FIG. 11.
Figure 12B:
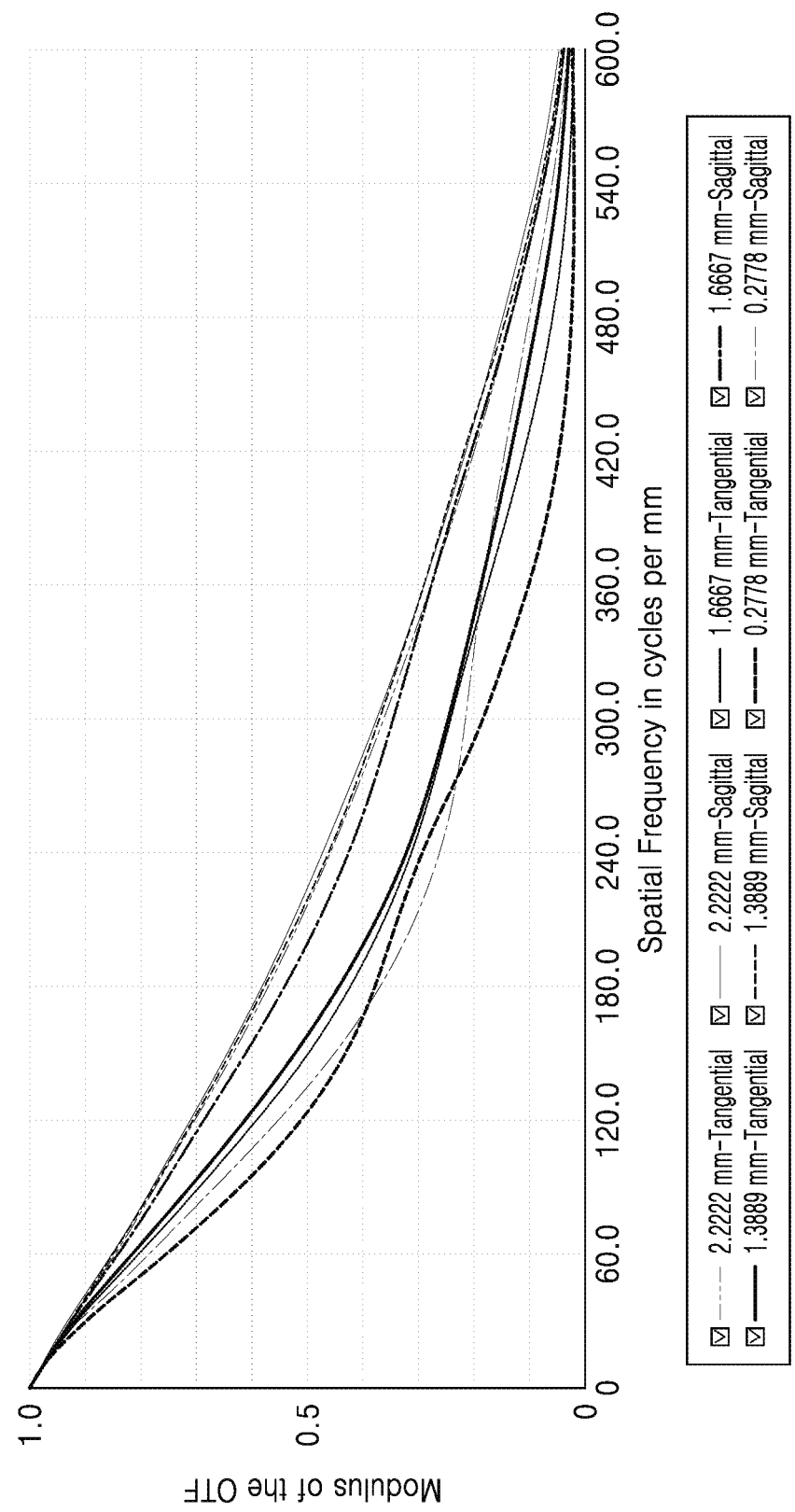

Table 1 and Table 2, Table 3 and Table 4, and Table 5 and Table 6 exemplarily illustrate design data of the lens assembly 20 according to an example embodiment. FIG. 11 shows the focusing of light according to an incident direction when designing a lens assembly 20 according to an example embodiment according to the design data of Tables 1 to 6. FIGS. 12A and 12B show the modulus of the optical transfer function (OTF) performance of a lens assembly 20 according to an example embodiment when designed as shown in Table 1 to Table 6 and FIG. 11. According to an example embodiment, the OTF may include modulation transfer function (MTF). In FIGS. 12A and 12B, a horizontal axis represents a spatial frequency, and a vertical axis represents an MTF value. "Diff.Limit" represents the Diffraction Limit, which means the theoretical MTF limit. In addition, for example, in "2.5000 mm-Sagittal", the number indicates an image height of 2.5 mm, which means the distance from the center of the image sensor.

TABLE 1

| Surface | Radius (mm) | Thickness (mm) | Material | Conic | Norm. Radius |
|---|---|---|---|---|---|
| S1 | 3.2819 | 1.5115 | A551425 | 0.2899 | 0.9824 |
| S2 | 41.2487 | 0.0500 | | 65.8977 | 2.3211 |

TABLE 2

| Surface | A0 | A1 | A2 | A3 | A4 | A5 | A6 |
|---|---|---|---|---|---|---|---|
| S1 | −3.25E−03 | 8.86E−05 | −7.81E−06 | 5.40E−07 | −2.63E−08 | −6.16E−10 | 3.93E−11 |
| S2 | −2.00E−02 | −1.61E−02 | −2.63E−02 | 7.19E−03 | −9.07E−03 | 9.03E−03 | −3.62E−03 |

TABLE 3

| Surface | Radius (mm) | Thickness (mm) | Material | Conic | Norm. Radius |
|---|---|---|---|---|---|
| S3 | 2.3126 | 0.4000 | EP700025 | −12.7988 | 0.8268 |
| S4 | 1.4493 | 0.8065 | | −1.6497 | 0.7429 |

TABLE 4

| Surface | A0 | A1 | A2 | A3 | A4 | A5 | A6 |
|---|---|---|---|---|---|---|---|
| S1 | 2.71E−02 | −1.16E−03 | 5.80E−05 | −1.91E−06 | −1.20E−07 | 6.33E−09 | 5.27E−10 |
| S2 | −1.53E−03 | 1.08E−03 | −9.02E−05 | −3.10E−06 | 1.84E−06 | −1.84E−07 | 2.94E−09 |

TABLE 5

|  | Radius (mm) | Thickness (mm) | Material | Conic | Type | Norm. Radius |
|---|---|---|---|---|---|---|
| ML1 | Infinity | 0.6000 | SILICA | 0.0000 | 1.0000 | 1 |
| ML2 | Infinity | 0.0500 |  | 0.0000 | 1.0000 | 1 |

TABLE 6

|  | Coeff. on ^2 | Coeff. on ^4 | Coeff. on ^6 | Coeff. on ^8 | Coeff. on ^10 | Coeff. on ^12 | Coeff. on ^14 | Coeff. on ^16 | Coeff. on ^18 | Coeff. on ^20 |
|---|---|---|---|---|---|---|---|---|---|---|
| ML1 | −226.8228 | 62.1423 | −139.2577 | 94.9498 | −23.8132 | 0.2070 | 0.4804 | −6.47E−01 | 4.79E−01 | −8.85E−02 |
| ML2 | 233.8962 | 0.8835 | 20.8284 | 34.0985 | −60.6878 | 23.0255 | 6.1855 | −4.45E+00 | −3.41E−01 | 3.31E−01 |

Tables 1 and 2 show an example of design data of the first refractive lens 21, and Tables 3 and 4 show an example of design data of the second refractive lens 25.

In Tables 1 and 3, "conic" means conic constant, and "Norm.Radius" means a normalized radius value.

Aspherical data for the first to fourth lens surfaces S1, S2, S3, and S4 of Tables 1 to 4 are obtained by applying an aspherical expression formula of a Q-polynomials (Qbfs) method. In Tables 2 and 4, A1, A2, A3, A4, A5, and A6 represent aspherical coefficients of the first to fourth lens surfaces S1, S2, S3, and S4. The first lens surface S1 represents a lens surface 21a positioned on an entrance pupil side of the first refractive lens 21, and the second lens surface S2 represents an opposite lens surface. The third lens surface S3 represents a lens surface of the second refractive lens 25 facing the first refractive lens 21, and the fourth lens surface S4 represents the opposite lens surface 25a.

Tables 1 and 2, and Tables 3 and 4 show examples in which each of the first to fourth lens surfaces S1, S2, S3, and S4 is designed as an aspherical lens surface. As shown in Table 1 and FIG. 11, the first refractive lens 21 may be formed of a low-dispersion material, for example, a material of A551425. As shown in Table 3 and FIG. 11, the second refractive lens 25 may be formed of a high-dispersion material, for example, a material EP700025.

Tables 5 and 6 show an example of design data of the first meta lens ML1 and the second meta lens ML2. Table 5 shows an example in which the spacer 101 between the first and second meta lenses ML1 and ML2 is formed of a silica material to have a gap d of about 0.6000 mm. In Table 6, "Coeff. on^2i" represents the $A_i$ value in the polynomial expansion φ of Equation 1.

$$\Phi = M \sum_{i=0}^{N} A_i \rho^{2i}$$ [Equation 1]

The first meta lens ML1 and the second meta lens ML2 are provided to add a phase to a ray according to the polynomial development of Equation 1. In Equation 1, N represents the number of polynomial coefficients. $A_i$ is the polynomial coefficient at the 2i square ($2i^{th}$ power) of the radius distance ρ, and M is the diffraction order. Tables 5 and 6 show an example in which the number of polynomial coefficients is N=10 and the diffraction order is M=1.

In addition, as illustrated in FIG. 11, the entrance pupil corresponding to the lens diameter of the first refractive lens 21 may be formed as about 5.06 mm, and when a distance from the entrance pupil to an exit pupil of the lens assembly 20 is about 6.13 mm and a width of the optical element 30 about 2.71 mm and the first refractive lens 21, the second refractive lens 25, the first meta lens ML1 and the second meta lens ML2 are designed with data in Tables 1 to 6, the total focal length of the lens assembly 20 may be, for example, about 11.64 mm, and an image may be formed on an image plane over a range of about 2.5 mm from the central axis.

By applying the lens assembly 20 and the lens assembly 120 according to various example embodiments as described above, a telephoto camera of various magnifications may be implemented, and by applying the meta lens 100 provided to serve as color dispersion compensation based on a difference in optical paths between wavelengths, it is possible to overcome mounting space constraints and limitations of lens materials.

Figure 13:
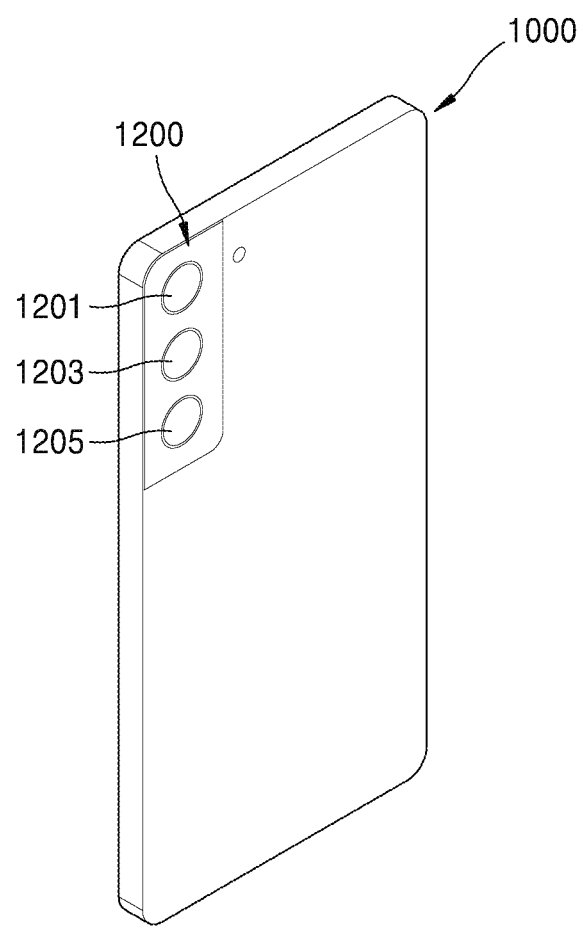
FIG. 13 is a conceptual diagram illustrating an example in which an imaging apparatus including a lens assembly according to an example embodiment is applied as a telephoto camera to a mobile apparatus.

FIG. 13 is a conceptual diagram illustrating an example in which an imaging apparatus including a lens assembly according to an example embodiment is applied to a mobile apparatus 1000 as a telephoto camera.

Referring to FIG. 13, a plurality of cameras 1200 are mounted on the mobile device 1000, and at least one of the plurality of cameras 1200 may be a telephoto camera. For example, the mobile apparatus 1000 may include a first camera 1201, a second camera 1203, and a third camera 1205 on a rear surface mobile apparatus 1000. According to an example embodiment, at least one of the first camera 1201, the second camera 1203, and the third camera 1205 may be a telephoto camera. For example, the third camera 1205 may be a telephoto camera. One of the first camera 1201 and the second camera 1203 may be, for example, a wide-angle camera, and the other may be, for example, an ultra-wide-angle camera. However, the disclosure is not limited thereto. For example, according to other example embodiments, the number of cameras and/or the type of cameras may vary. According to an example embodiment, the third camera 1205 may include any one of the lens assemblies according to various example embodiments described above. In addition, the first and/or second cameras 1201 and 1203 may include any one of the lens assemblies according to various example embodiments described above.

FIG. 13 shows an example in which triple cameras are provided on the rear of the mobile apparatus 1000, and one of the triple cameras is a telephoto camera, but the disclosure is not limited thereto. For example, the mobile apparatus 1000 may include two or more cameras, for example, dual, triple, quad, penta, or more cameras, one or more of which may be a telephoto camera. In this case, one or more telephoto cameras may include the lens assembly according to the above-described embodiment. In addition, the lens assembly according to the above-described embodiment may be applied to the remaining cameras.

Figure 14:
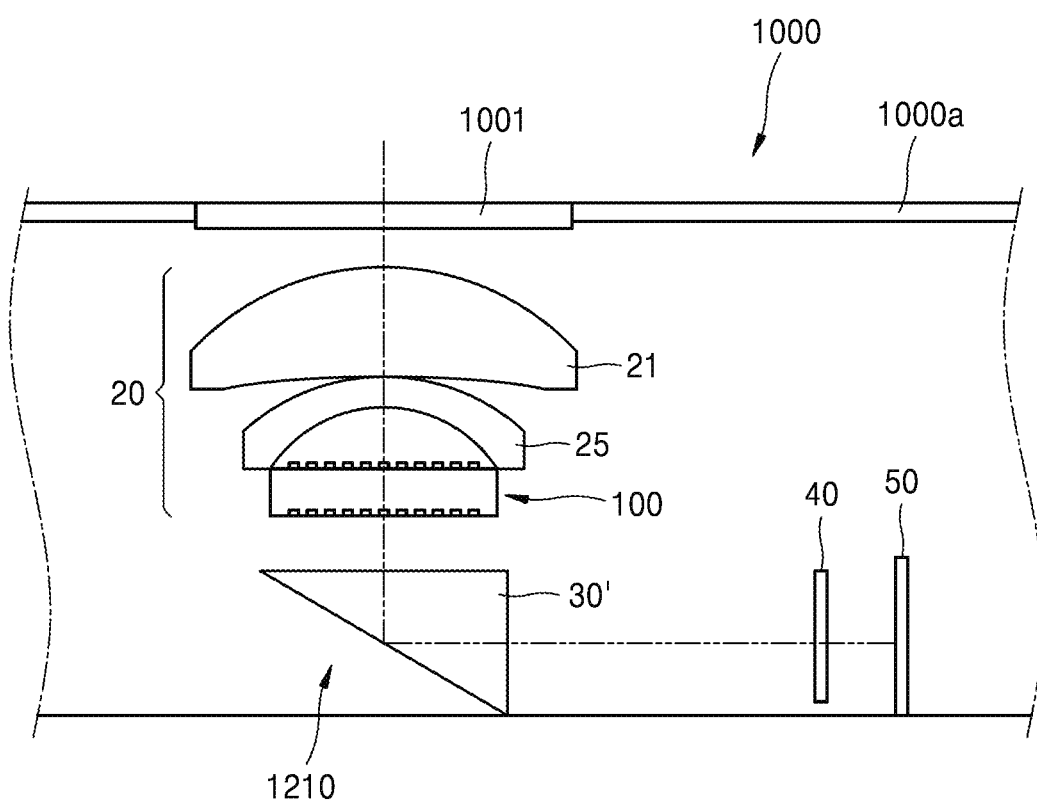
FIG. 14 illustrates an example in which a folded telephoto camera including a lens assembly according to an example embodiment is arranged inside a mobile apparatus.

FIG. 14 illustrates an example in which a folded telephoto camera 1210 to which a lens assembly 20 according to an example embodiment is applied is arranged inside a mobile apparatus 1000. For example, as illustrated in FIG. 13, when the mobile apparatus 1000 includes the first camera 1201, the second camera 1203, and the third camera 1205 on the rear surface thereof and the third camera 1205 is a telephoto camera, the folded telephoto camera 1210 may correspond to, for example, the third camera 1205. Also, the folded telephoto camera 1210 may be the first camera 1201 or the second camera 1203. When four or more cameras are provided in the mobile device 1000, the folded telephoto camera 1210 may correspond to at least one of the four or more cameras. FIG. 14 shows an example in which the lens assembly 20 of FIG. 2 is applied, which is exemplary, and any one of the lens assemblies of FIGS. 1, 3, and 4 or a modified example thereof may be applied.

As shown in FIG. 14, a folded optical system may be implemented by applying an optical element, for example, a prism 30' for bending a light travelling path may be implemented. The prism 30' may be arranged such that an internal reflection surface forms about 45 degrees or a different inclination angle with an inner bottom of the mobile device 1000. Light reflected from the object may be incident into the mobile apparatus 1000 through a transparent window 1001. According to various example embodiments, the transparent window 1001 may be omitted, may be positioned in the same plane as the cover 1000a of the mobile device 1000, or may be positioned to protrude or be depressed from the cover 1000a.

In addition, imaging apparatuses 10 and 110 including the lens assembly 20 and the lens assembly 120, respectively, according to example embodiments may be applied to various electronic apparatuses requiring a telephoto camera.

Figure 15:
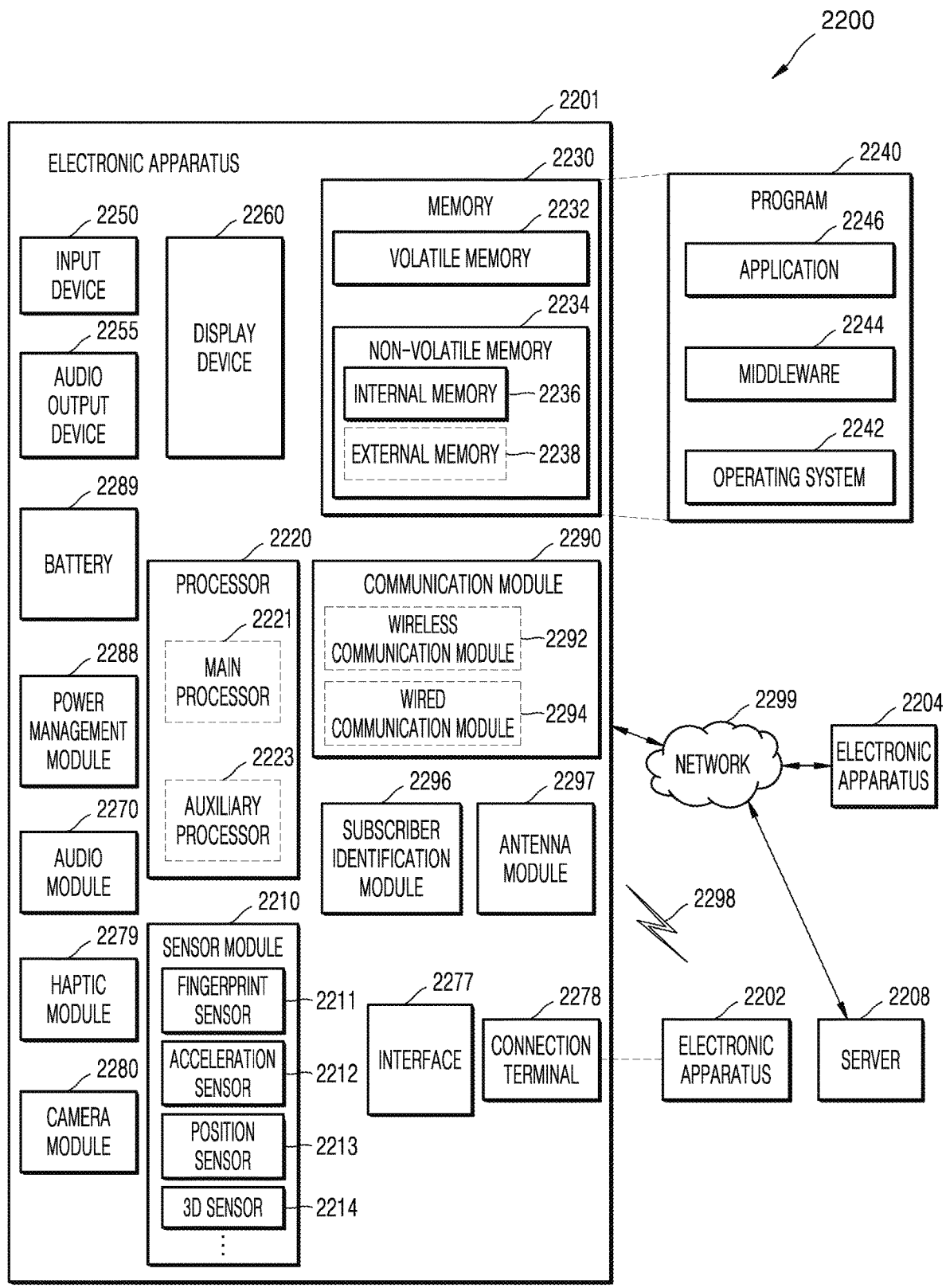
FIG. 15 is a block diagram illustrating a schematic configuration of an electronic apparatus according to an example embodiment.

FIG. 15 is a block diagram illustrating a schematic configuration of an electronic apparatus 2201 according to an example embodiment.

Referring to FIG. 15, in a network environment 2200, the electronic apparatus 2201 may communicate with another electronic apparatus 2202 through a first network 2298 (a short-range wireless communication network or the like), or with another electronic apparatus 2204 and/or a server 2208 through a second network 2299 (a long-range wireless communication network or the like). The electronic apparatus 2201 may communicate with the electronic apparatus 2204 through the server 2208. The electronic apparatus 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. Some of these components (such as display device 2260, etc.) may be omitted in the electronic apparatus 2201, or other components may be added to the electronic apparatus 2201. Some of these components may be implemented as one integrated circuit. For example, a fingerprint sensor 2211, an iris sensor, an illumination sensor, etc., of the sensor module 2210 may be embedded in the display apparatus 2260 (display, etc.). In addition, the camera module 2280, the haptic module 2279, and the sensor module 2210 may include some of the processor 2220 and the memory 2230, respectively.

The processor 2220 may execute software (program 2240 or the like) to control one or a plurality of other components (hardware, software components, etc.) of the electronic apparatus 2201 connected to the processor 2220, and may perform various data processing or operations. As part of data processing or operation, the processor 2220 may load commands and/or data received from other components (sensor modules 2210, communication modules 2290, etc.) in a volatile memory 2232, process commands and/or data stored in the volatile memory 2232, and store the result data in a nonvolatile memory 2234. The processor 2220 may include a main processor 2221 (a central processing unit, an application processor, etc.) and an auxiliary processor 2223 (a graphics processing unit, an image signal processor, a sensor hub processor, a communication processor, etc.) that may be operated independently of or together with the main processor 2221. The auxiliary processor 2223 may use less power than the main processor 2221 and perform a specialized function.

The auxiliary processor 2223 may control the functionality and/or status associated with some of the components of the electronic apparatus 2201 (the display apparatus 2260, the sensor module 2210, the communication module 2290, etc.), in place of the main processor 2221 while the main processor 2221 is in an inactive state (sleep state), or in conjunction with the main processor 2221 while the main processor 2221 is in an active state (application execution state). The auxiliary processor 2223 (image signal processor, communication processor, etc.) may be implemented as part of other functionally related components (camera module 2280, communication module 2290, etc.).

The memory 2230 may store various data required by components (processor 2220, sensor module 2276, etc.) of the electronic apparatus 2201. The data may include, for example, input data and/or output data for software (program 2240 or the like) and related commands. The memory 2230 may include the volatile memory 2232 and/or the nonvolatile memory 2234. The nonvolatile memory 2234 may include an internal memory 2236 and/or an external memory 2238.

The program 2240 may be stored in the memory 2230 as software, and may include an operating system 2242, middleware 2244, and/or an application 2246.

The input device 2250 may receive commands and/or data to be used in components (processor 2220, etc.) of the electronic apparatus 2201 from the outside (user, etc.) of the electronic apparatus 2201. The input device 2250 may include a microphone, a mouse, a keyboard, and/or a digital pen (such as a stylus pen).

The audio output device 2255 may output the sound signal to the outside of the electronic apparatus 2201. The audio output device 2255 may include a speaker and/or a receiver. Speakers may be used for general purposes such as multimedia playback or recording playback, and receivers may be used to receive incoming calls. The receiver may be coupled as part of a speaker or may be implemented as an independent separate apparatus.

The display device 2260 may visually provide information to the outside of the electronic apparatus 2201. The display device 2260 may include a display, a hologram device, or a projector and a control circuit for controlling the corresponding device. The display apparatus 2260 may include a touch circuit configured to sense a touch, and/or a sensor circuit (a pressure sensor, etc.) configured to measure an intensity of a force generated by the touch.

The audio module 2270 may convert sound into an electrical signal or conversely convert the electrical signal into sound. The audio module 2270 may acquire sound through the input apparatus 2250 or output sound through the audio output apparatus 2255 and/or a speaker and/or a headphone of another electronic apparatus (e.g., electronic apparatus 2102, etc.) directly or wirelessly connected to the electronic apparatus 2201.

The sensor module 2210 may detect an operating state (power, temperature, etc.) or an external environmental state (user state, etc.) of the electronic apparatus 2201 and generate an electrical signal and/or a data value corresponding to the sensed state. The sensor module 2210 may include a fingerprint sensor 2211, an acceleration sensor 2212, a position sensor 2213, a three-dimensional (3D) sensor 2214 and the like, and may also include an iris sensor, a gyro sensor, a barometric sensor, a grip sensor, a proximity sensor, a color sensor, an infrared (IR) sensor, a biometric sensor, a temperature sensor, a humidity sensor, and/or an illumination sensor.

The 3D sensor 2214 senses the shape, movement, and the like of an object by irradiating predetermined light to the object and analyzing the light reflected from the object, for example, the lens assembly 20 according to the above-described embodiment and the imaging apparatus 10 including the same may be applied thereto.

The interface 2277 may support one or more designated protocols that may be used for electronic apparatus 2201 to be directly or wirelessly connected to another electronic apparatus (e.g., electronic apparatus 2102, etc.). The interface 2277 may include a high definition multimedia interface (HDMI), a universal serial bus (USB) interface, an SD card interface, and/or an audio interface.

The connection terminal 2278 may include a connector through which the electronic apparatus 2201 may be physically connected to another apparatus (e.g., electronic apparatus 2102, etc.). The connection terminal 2278 may include an HDMI connector, a USB connector, an SD card connector, and/or an audio connector (such as a headphone connector, etc.).

The haptic module 2279 may convert an electrical signal to a mechanical stimulus (vibration, motion, etc.) or an electrical stimulus that a user can recognize through a tactile or motion sensation. The haptic module 2279 may include a motor, a piezoelectric element, and/or an electrical stimulus.

The camera module 2280 may capture still images and moving images. The camera module 2280 may include, for example, lens assemblies, image sensors, image signal processors, and/or flashes. A plurality of camera modules 2280 may be provided, and each camera module 2280 may include, for example, a lens assembly, an image sensor, an image signal processor, and/or a flash, or may include a lens assembly and an image sensor, and an image signal processor and/or a flash may be commonly applied to the plurality of camera modules 2280. The lens assembly 2310 included in the camera module 2280 may collect light emitted from an object which is an image capturing object, and the lens assembly 2310 may include the lens assembly 20 and the lens assembly 120 of various example embodiments described above or a structure modified therefrom. An example structure of the camera module 2280 will be described later with reference to FIG. 16.

The power management module 2288 may manage power supplied to the electronic apparatus 2201. The power management module 2288 may be implemented as part of a power management integrated circuit (PMIC).

The battery 2289 may supply power to components of the electronic apparatus 2201. The battery 2289 may include a non-rechargeable primary battery, a rechargeable secondary battery, and/or a fuel cell.

The communication module 2290 may establish a direct (wired) communication channel and/or wireless communication channel between the electronic apparatus 2201 and another electronic apparatus (the electronic apparatus 2102, the electronic apparatus 2104, the server 2108, etc.), and support communication execution through the established communication channel. The communication module 2290 may include one or more communication processors that operate independently of the processor 2220 (application processor, etc.) and support direct communication and/or wireless communication. The communication module 2290 may include a wireless communication module 2292 (a cellular communication module, a short-range wireless communication module, a GNSS (Global Navigation Satellite System, etc.) communication module, and/or a wired communication module 2294 (a local area network (LAN) communication module, a power line communication module, etc.). A corresponding communication module of these communication modules may communicate with other electronic apparatuses through a first network 2298 (a short-range communication network such as Bluetooth, WiFi Direct, or infrared data association (IrDA)), or a second network 2299 (a long-range communication network such as a cellular network, Internet, or computer network (LAN, WAN, etc.)). These various types of communication modules may be integrated into a single component (such as a single chip, etc.), or may be implemented as a plurality of separate components (multiple chips). The wireless communication module 2292 may identify and authenticate the electronic apparatus 2201 in a communication network such as a first network 2298 and/or a second network 2299 using subscriber information (such as an international mobile subscriber identifier (IMSI) stored in the subscriber identification module 2296.

The antenna module 2297 may transmit a signal and/or power to the outside (such as another electronic apparatus, etc.) or receive the signal and/or power from the outside. The antenna may include a radiator formed of a conductive pattern formed on the substrate (PCB, etc.). The antenna module 2297 may include one or a plurality of antennas. When a plurality of antennas are included, an antenna suitable for a communication scheme used in a communication network such as a first network 2298 and/or a second network 2299 may be selected from among the plurality of antennas by the communication module 2290. A signal and/or power may be transmitted or received between the communication module 2290 and another electronic apparatus through the selected antenna. Other components (RFIC, etc.) in addition to the antenna may be included as a part of the antenna module 2297.

Some of the components may be connected to each other via communication methods between peripherals (such as buses, General Purpose Input and Output (GPIO), Serial Peripheral Interface (SPI), and Mobile Industry Processor Interface (MIPI), etc.) to interchange signals (commands, data, etc.).

The command or data may be transmitted or received between the electronic apparatus 2201 and the external electronic apparatus 2204 through the server 2108 connected to the second network 2299. Other electronic apparatuses 2202 and 2204 may be the same or different types of apparatuses as the electronic apparatus 2201. All or some of the operations executed in the electronic apparatus 2201 may be executed in one or more of the other electronic apparatuses 2202, 2204, and 2208. For example, when the electronic apparatus 2201 needs to perform a function or service, it may request one or more other electronic apparatuses to perform part or all of the function or service instead of executing the function or service on its own. One or more other electronic apparatuses receiving the request may execute an additional function or service related to the request and transmit a result of the execution to the electronic apparatus 2201. To this end, cloud computing, distributed computing, and/or client-server computing technology may be used.

Figure 16:
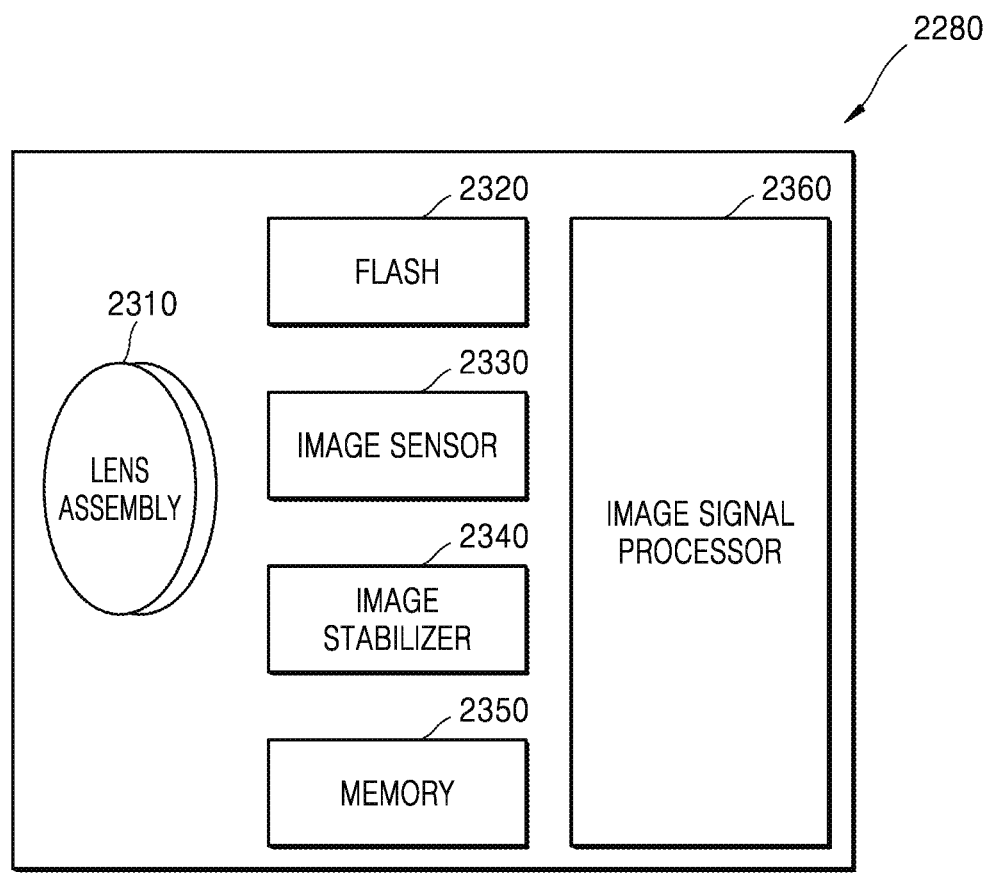
FIG. 16 is a block diagram illustrating a schematic configuration of a camera module included in the electronic apparatus of FIG. 15.

FIG. 16 is a block diagram exemplarily illustrating a schematic configuration of a camera module 2280 included in the electronic apparatus 2201 of FIG. 15.

Referring to FIG. 16, the camera module 2280 may include a lens assembly 2310, a flash 2320, image sensor 2330, an image stabilizer 2340, a memory 2350 (buffer memory, etc.), and/or an image signal processor 2360. The lens assembly 2310 may collect light emitted from an object to be photographed, and may form an image on the image sensor 2330.

In addition, the camera module 2280 may further include an actuator. The actuator may drive the positions of lens elements constituting the lens assembly 2310 for, for example, zooming and/or autofocus AF and adjust the separation distance between lens elements.

The camera module 2280 may include one of the lens assembly 20 and the lens assembly 120 according to various example embodiments described above, as the lens assembly 2310, and the camera module 2280 may be a telephoto camera module. In addition, the camera module 2280 may include a plurality of lens assemblies 2310 and a plurality of image sensors 2330 corresponding thereto, and at least one of the plurality of lens assemblies 2310 may include at least one of the lens assembly 20 and the lens assembly 120 according to various example embodiments, and accordingly, the camera module 2280 may include at least one telephoto camera module. For example, the plurality of lens assemblies 2310 may include a telephoto lens assembly and a wide-angle and/or ultra-wide-angle lens assembly, and at least one of the lens assembly 20 and the lens assembly 120 according to various example embodiments described above may be applied as the telephoto lens assembly. Some of the plurality of lens assemblies 2310 may have the same lens attributes (view angle, focal distance, autofocus, F number, optical zoom, etc.), or may have different lens attributes.

As described above, the camera module 2280 may include a telephoto camera module including a telephoto lens assembly, and may further include a wide-angle camera module and/or an ultra-wide-angle camera module. In this case, the camera module 2280 may be, for example, dual, triple, quad, penta or more cameras, a 360-degree camera, a spherical camera, or the like.

The flash 2320 may emit light used to reinforce light emitted or reflected from the object. The flash 2320 may include one or more light emitting diodes (red-green-blue (RGB) LEDs, white LEDs, infrared LEDs, ultraviolet LEDs, etc.), and/or Xenon lamp.

The image sensor 2330 may obtain an image corresponding to the object by converting light emitted or reflected from the object and transmitted through the lens assembly 2310 into an electrical signal. The image sensor 2330 may include one or a plurality of sensors selected from image sensors having different attributes, such as an RGB sensor, a black and white (BW) sensor, an IR sensor, or a UV sensor. Each of the sensors included in the image sensor 2330 may be implemented as a charged coupled apparatus (CCD) sensor and/or a complementary metal oxide semiconductor (CMOS) sensor. As described above, the camera module 2280 may include a plurality of lens assemblies 2310, and may be provided with a plurality of image sensors 2330 corresponding thereto.

The image stabilizer 2340 may move one or a plurality of lenses or image sensors 2330 included in the lens assembly 2310 in a specific direction or control operational characteristics of the image sensor 2330 (e.g., adjust read-out timing) in response to movement of the camera module 2280 or the electronic apparatus 2201 including the camera module 2280, thereby compensating for the negative effects of movement. The image stabilizer 2340 may detect a movement of the camera module 2280 or the electronic apparatus 2201 using a gyro sensor or an acceleration sensor arranged inside or outside the camera module 2280. The image stabilizer 2340 may be implemented optically.

The memory 2350 may store some or all data of an image acquired through the image sensor 2330 for a next image processing operation. For example, when multiple images are acquired at high speed, the acquired original data (Bayer-Patterned data, high-resolution data, etc.) may be stored in memory 2350, and only low-resolution images are displayed, and then the original data of the selected image (user's selection, etc.) may be used to be transferred to the image signal processor 2360. The memory 2350 may be integrated into the memory 2230 of the electronic apparatus 2201 or may be configured as a separate memory that is operated independently.

The image signal processor 2360 may perform one or more image processes on an image acquired through the image sensor 2330 or image data stored in the memory 2350. One or more image processes may include depth map generation, three-dimensional modeling, panorama generation, feature point extraction, image synthesis, and/or image compensation (noise reduction, resolution adjustment, brightness adjustment, blurring, sharpening, softening, etc.). The image signal processor 2360 may perform control (exposure time control, read-out timing control, etc.) on components (image sensor 2330 or the like) included in the camera module 2280. The image processed by the image signal processor 2360 may be stored again in the memory 2350 for further processing or may be provided to an external component (memory 2230, the display apparatus 2260, the electronic apparatus 2202, the electronic apparatus 2204, the server 2208, or the like) of the camera module 2280. The image signal processor 2360 may be integrated into the processor 2220 or may be configured as a separate processor operated independently from the processor 2220. When the image signal processor 2360 is configured as a separate processor from the processor 2220, the image processed by the image signal processor 2360 may be displayed through the display apparatus 2260 after additional image processing by the processor 2220.

Meanwhile, the electronic apparatus 2201 may include a plurality of camera modules 2280 having respectively different attributes or functions. In this case, at least one of the plurality of camera modules 2280 may be a telephoto camera, and the rest may be a wide-angle camera and/or an ultra-wide-angle camera. The plurality of camera modules 2280 may be implemented as a rear camera and/or a front camera.

The camera module 2280 described above may be mounted on various electronic apparatuses. For example, the camera module 2280 may be mounted on electronic apparatuses such as smartphones, wearable apparatuses, Internet of things (IoT) apparatuses, home appliances, tablet PCs, personal digital assistants (PDAs), portable multimedia players (PMPs), navigation, drones, advanced drivers assistance systems (ADAS), and the like.

The lens assembly according to an example embodiment may include the first refractive lens, the second refractive lens, and the meta lens to implement a telephoto lens.

By applying the lens assembly according to this embodiment, a telephoto camera of various magnifications may be implemented. Furthermore, by applying a meta-lens designed to serve as color dispersion compensation based on differences in optical paths between wavelengths, mounting space constraints and the limitations of lens materials may be overcome.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A lens assembly comprising:
a first refractive lens;
a second refractive lens; and
a plurality of meta lenses arranged between the second refractive lens and an image plane,
wherein the second refractive lens is provided between the first refractive lens and the plurality of meta lenses,
wherein, among the first refractive lens and the second refractive lens, the first refractive lens is provided closest to an object,
wherein the first refractive lens has a positive refractive power and is configured to output first light, and
wherein the second refractive lens has a negative refractive power and is configured to receive the first light from the first refractive lens, correct secondary chromatic aberration in the first light, and output second light with the secondary chromatic aberration corrected in the first light,
wherein the plurality of meta lenses comprise a first meta lens and a second meta lens spaced apart from the first meta lens, and
wherein each of the first meta lens and the second meta lens comprises a plurality of nanostructures configured to receive the second light from the second refractive lens, correct primary chromatic aberration in the second light, and output third light with the primary chromatic aberration corrected in the second light.

2. The lens assembly of claim 1, wherein the first refractive lens comprises a first dispersion material, and
wherein the second refractive lens comprises a second dispersion material.

3. The lens assembly of claim 2, wherein the first refractive lens comprises a plastic material having an Abbe number of 45 or more and 65 or less.

4. The lens assembly of claim 3, wherein the second refractive lens comprises a plastic material having an Abbe number of 25 or more and 45 or less.

5. The lens assembly of claim 2, wherein the second refractive lens comprises a plastic material having an Abbe number of 25 or more and 45 or less.

6. The lens assembly of claim 1, further comprising at least one third refractive lens configured to focus the third light on the image plane.

7. The lens assembly of claim 1, further comprising a spacer provided between the first meta lens and the second meta lens.

8. The lens assembly of claim 1, further comprising an optical element configured to bend the second light or the third light.

9. The lens assembly of claim 8, wherein the optical element is a prism.

10. The lens assembly of claim 1, wherein the plurality of nanostructures of each of the first and second meta lenses are formed in an array, and
wherein each of the plurality of nanostructures has a dimension less than an operating wavelength and has a width, which varies according to a position in the array.

11. The lens assembly of claim 10, wherein at least one of the first and second meta lenses comprises
the plurality of nanostructures and a peripheral material configured to surround the plurality of nanostructures, and
an effective refractive index of each of the plurality of nanostructures is greater than or less than an effective refractive index of the peripheral material.

12. The lens assembly of claim 10, wherein at least one of the first and second meta lenses comprises:
a layer comprising the plurality of nanostructures, and
a peripheral material configured to surround the plurality of nanostructures in a single layer or in two or more layers.

13. The lens assembly of claim 10, wherein each of the first and second meta lenses further comprises a peripheral material, and
wherein a difference between a first refractive index of the plurality of nanostructures and a second refractive index of the peripheral material of the plurality of nanostructures is 0.5 or more.

14. The lens assembly of claim 13, wherein the plurality of nanostructures are provided to have the first refractive index less than the second refractive index of the peripheral material, and
wherein the plurality of nanostructures include SiO2 or air.

15. The lens assembly of claim 13, wherein the plurality of nanostructures comprises at least one of c-Si, p-Si, a-Si, III-V compound semiconductor, SiC, TiO2, TiSiOx, or SiN, and
wherein the plurality of nanostructures are provided to have a refractive index greater than the refractive index of the peripheral material.

16. The lens assembly of claim 15, wherein the III-V compound semiconductor comprises at least one of GaP, GaN or GaAs.

17. An imaging apparatus comprising:
a lens assembly; and
an image sensor configured to convert an optical image formed by the lens assembly into an electrical signal,
wherein the lens assembly comprises:
a first refractive lens,
a second refractive lens, and
a plurality of meta lenses arranged between the second refractive lens and an image plane,
wherein the second refractive lens is provided between the first refractive lens, and the plurality of meta lenses,
wherein, among the first refractive lens and the second refractive lens, the first refractive lens is provided closest to an object,
wherein the first refractive lens has a positive refractive power and is configured to output first light, and
wherein the second refractive lens has a negative refractive power and is configured to receive the first light from the first refractive lens, correct secondary chromatic aberration in the first light, and output second light with the secondary chromatic aberration corrected in the first light, wherein the plurality to meta lenses comprise a first meta lens and a second meta lens spaced apart from the first meta lens, and wherein each of the first meta lens and the second meta lens comprises a plurality of nanostructures configured to receive the second light from the second refractive lens, correct primary chromatic aberration in the second light, and output third light with the primary chromatic aberration corrected in the second light.

18. An electronic apparatus comprising a camera comprising: a lens assembly comprising a first refractive lens, a second refractive lens, and a plurality of meta lenses arranged between the second refractive lens and an image plane; and an image sensor configured to convert an optical image formed by the lens assembly into an electrical signal, wherein the second refractive lens is provided between the first refractive lens and the plurality of meta lenses, wherein, among the first refractive lens and the second refractive lens, the first refractive lens is provided closest to an object, wherein the first refractive lens has a positive refractive power and is configured to output first light, and wherein the second refractive lens has a negative refractive power and is configured to receive the first light from the first refractive lens, correct secondary chromatic aberration in the first light, and output second light with the secondary chromatic aberration corrected in the first light, wherein the plurality to meta lenses comprise a first meta lens and a second meta lens spaced apart from the first meta lens, and wherein each of the first meta lens and the second meta lens comprises a plurality of nanostructures configured to receive the second light from the second refractive lens, correct primary chromatic aberration in the second light, and output third light with the primary chromatic aberration corrected in the second light.

\* \* \* \* \*